US010664685B2

(12) United States Patent
Hoffman et al.

(10) Patent No.: US 10,664,685 B2
(45) Date of Patent: May 26, 2020

(54) METHODS, SYSTEMS, AND DEVICES FOR OPTICAL SECTIONING

(71) Applicant: Northeastern University, Boston, MA (US)

(72) Inventors: Zachary R. Hoffman, Boston, MA (US); Charles A. DiMarzio, Cambridge, MA (US)

(73) Assignee: NORTHEASTERN UNIVERSITY, Boston, MA (US)

( * ) Notice: Subject to any disclaimer, the term of this patent is extended or adjusted under 35 U.S.C. 154(b) by 53 days.

(21) Appl. No.: 15/887,966

(22) Filed: Feb. 2, 2018

(65) Prior Publication Data

US 2018/0239946 A1    Aug. 23, 2018

Related U.S. Application Data

(60) Provisional application No. 62/454,677, filed on Feb. 3, 2017.

(51) Int. Cl.
*G06K 9/00* (2006.01)
*G02B 21/36* (2006.01)
(Continued)

(52) U.S. Cl.
CPC .......... *G06K 9/0014* (2013.01); *G02B 21/06* (2013.01); *G02B 21/365* (2013.01);
(Continued)

(58) Field of Classification Search
CPC .... G02B 21/06; G02B 21/367; G02B 21/365; G02B 27/58; G06K 9/346; G06K 9/0014
See application file for complete search history.

(56) References Cited

U.S. PATENT DOCUMENTS 3,013,467 A    12/1961  Minsky
5,602,934 A  *  2/1997  Li ........................... G01R 33/56
                                                          382/128
(Continued)

OTHER PUBLICATIONS

Arigovindan, M., et al., "Effect of depth dependent spherical aberrations in 3D structured illumination microscopy," Optics Express, vol. 20; No. 6; 6527-6541 (2012).
(Continued)

*Primary Examiner* — Brenda C Bernardi
(74) *Attorney, Agent, or Firm* — Hamilton, Brook, Smith & Reynolds, P.C.

(57) ABSTRACT

Methods, systems, and devices described herein enable single-image optical sectioning, even at depth within turbid media, such as human skin or other tissue. Embodiments can eliminate the need for multiple image samples or raster scans, making in-vivo or live biological imaging easier and faster than multi-image sectioning techniques. Better contrast and resolution than traditional three-phase structured illumination microscopy (SIM) is possible in turbid media. Embodiments enable imaging of cell nuclei. Resolution and contrast resulting from disclosed embodiments are less sensitive to motion of or within patients or other targets than confocal microscopy and three-phase SIM techniques. Three-dimensional images of target specimens can be provided based on a group of single-image optical sections. Real-time imaging can also be provided.

20 Claims, 18 Drawing Sheets
(6 of 18 Drawing Sheet(s) Filed in Color)

(51) Int. Cl.
G02B 27/58 (2006.01)
G02B 21/06 (2006.01)
G06K 9/34 (2006.01)
(52) U.S. Cl.
CPC ........... *G02B 21/367* (2013.01); *G02B 27/58* (2013.01); *G06K 9/346* (2013.01)

(56) References Cited

U.S. PATENT DOCUMENTS

| | | | |
|---|---|---|---|
| 2011/0194175 A1* | 8/2011 | Dougherty | G01N 21/6458 359/386 |
| 2012/0133937 A1* | 5/2012 | Heintzmann | G01J 3/02 356/364 |
| 2016/0238827 A1* | 8/2016 | Shroff | G02B 21/0032 |
| 2018/0324394 A1* | 11/2018 | Xu | H04N 5/14 |

OTHER PUBLICATIONS

Booth, M.J., "Adaptive optics in microscopy," Phil. Trans. R. Soc. A., vol. 365; 2829-2843 (2007).
Cuccia, D.J., et al., "Modulated imaging: quantitative analysis and tomography of turbid media in the spatial-frequency domain," Optic Letters, vol. 30; No. 11; 1354-1356 (2005).
Cuccia, D.J., "Quantitation and mapping of tissue optical properties using modulated imaging," Journal of Biomedical Optics, vol. 14; No. 2; 024012-1-024012-13 (2009).
Glazowski, C.E. and Zavislan, J., "A coherent model for turbid imaging with confocal microscopy," Biomedical Optics Express, vol. 4; No. 4; 500-513 (2013).
Gustafsson, M.G.L., "Surpassing the lateral resolution limit by a factor of two using structured illumination microscopy," Journal of Microscopy, vol. 198; Pt.2; 82-87 (2000).
Haftek, M., "Compartmentalization of the human stratum corneum by persistent tight junction-like structures," Experimental Dermatology, vol. 20; 617-621 (2011).
Hoffman, Z.R. and DiMarzio, C.A., "Structured illumination microscopy using random intensity incoherent reflectance," Journal of Biomedical Optics, vol. 18; No. 6; 061216-1-061216-7 (2013).
Hoffman, Z.R. and DiMarzio, C.A., "Single-image structures illumination using Hilbert transform demodulation," Journal of Biomedical Optics, vol. 22; No. 5; 056011-1-056011-11 (2017).
Hoffman, Z.R. and DiMarzio, C.A., "Single image sectioning using spatial frequency domain imaging," Proceedings of SPIE, vol. 10070; 1007014-1-1007014-6 (2017).
Lal, A., et al., "Structured illumination microscopy image reconstruction algorithm," IEEE Journal of Selected Topic in Quantum Electronics, 15 pages (2015).
Larkin, K.G., "Natural demodulation of two-dimensional fringe patterns. I. General background of the spiral phase quadrature transform," J. Opt. Soc. Am., vol. 18; No. 8; 1862-1870 (2001).
Larkin, K.G., "Natural demodulation of two-dimensional fringe patterns. II. Stationary phase analysis of the spiral phase quadrature transform," J. Opt. Soc. Am. A., vol. 18; No. 8; 1871-1881 (2001).
Lim, D., et al., "Optically sectioned in vivo imaging with speckle illumination HiLo microscopy," Journal of Biomedical Optics, vol. 16; No. 1; 016014-1-016014-8 (2011).
McNally, J.G., "Artifcats in computational optical-sectioning microscopy," J. Opt. Soc. Am. A., vol. 11; No. 3; 1056-1067 (1994).
Mertz, J. and Kim, J., "Scanning light-sheet microscopy in the whole mouse brain with HiLo background rejection," Journal of Biomedical Optics, vol. 15; No. 1; 016027-1 (2010).
Mudry, E., et al., "Structured illumination microscopy using unknown speckle patterns," Nature Photonics, vol. 6; 312-315 (2012).
Nadeau, K.P., et al., "Advanced demodulation technique for the extraction of tissue optical properties and structural orientation contrast in the spatial frequency domain," Journal of Biomedical Optics, vol. 19; No. 5; 056013-1-056013-9 (2014).
Neil, M.A.A., et al., "Method of obtaining sectioning by using structured light in a conventional microscope," Optics Letters, vol. 22; No. 24; 1905-1907 (1997).
Notification of Transmittal of the International Search Report and the Written Opinion of the International Searching Authority for International Application No. PCT/US2018/016750, entitled: "Optical Sectioning," dated May 8, 2018.
O'Sullivan, T.D., et al., "Diffuse optical imaging using spatially and temporally modulated light," Journal of Biomedical Optics, vol. 17; No. 7; 071311-1-071311-14 (2012).
Patorski, K., et al., "Optically-sectioned two-shot structured illumination microscopy with Hilbert-Huang processing," Optics Express, vol. 22; No. 8; 9517-9527 (2014).
Preza, C., "Simulating structured-illumination microscopy in the presence of spherical aberrations," Proceedings of SPIE, vol. 7904; 79040D-1-79040D-8 (2011).
Rajadhyaksha, M., et al., "In Vivo Confocal Scanning Laser Microscopy of Human Skin: Melanin Provides Strong Contrast," J. Invest. Dermatol., vol. 104; 946-952 (1995).
Rajadhyaksha, M., "Reflectance Confocal Microscopy of Skin In Vivo: From Bench to Bedside," Lasers in Surgery and Medicine, vol. 49; 7-19 (2017).
Trusiak, M., et al., "Optical sectioning microscopy using two-frame structured illumination and Hilbert-Huang data processing," Proc. of SPIE, vol. 9441; 12 pages (2014).
International Preliminary Report on Patentability for International Application No. PCT/US2018/016750, entitled "Optical Sectioning," dated Aug. 6, 2019 (9 pages).

* cited by examiner

GROUP 6, ELEMENT 4

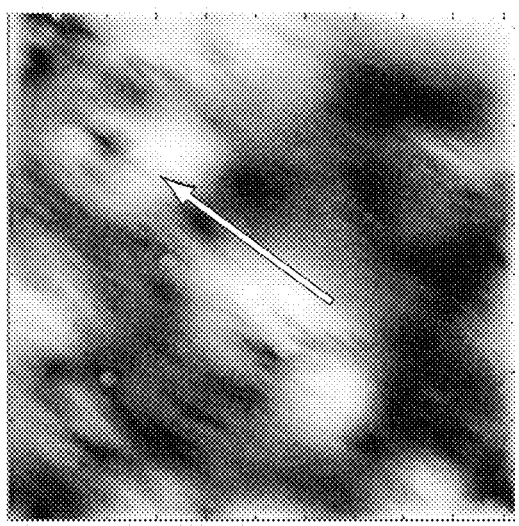
FIG. 15
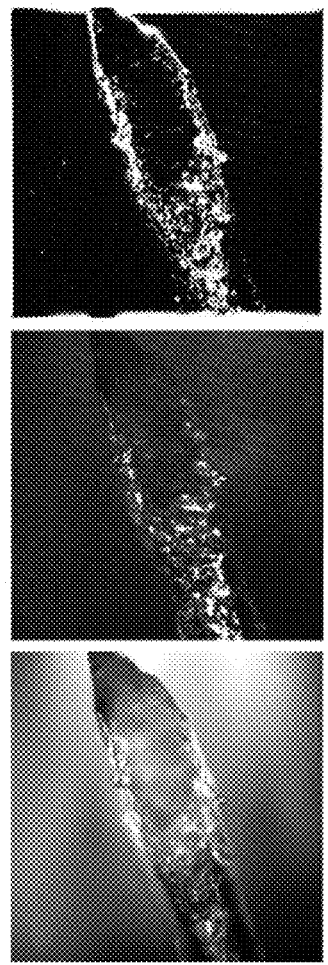
FIG. 16A
FIG. 16B
FIG. 16C

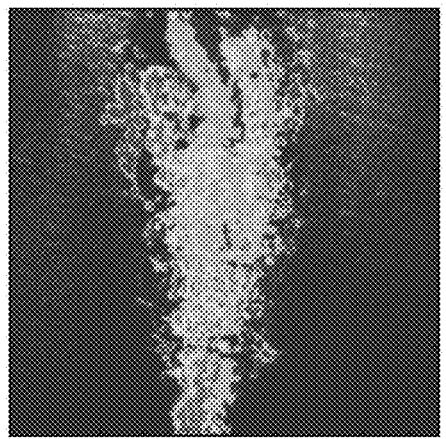
FIG. 17A  FIG. 17B
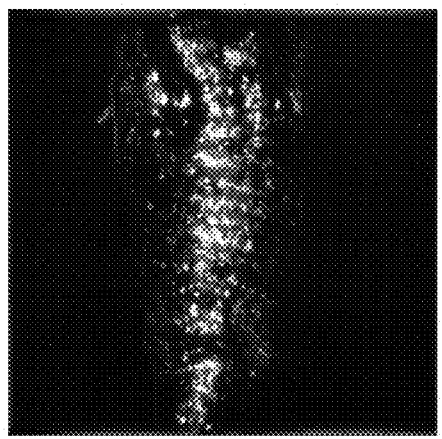
FIG. 18A  FIG. 18B

METHODS, SYSTEMS, AND DEVICES FOR OPTICAL SECTIONING

RELATED APPLICATION(S)

This application claims the benefit of U.S. Provisional Application No. 62/454,677, filed on Feb. 3, 2017. The entire teachings of the above application are incorporated herein by reference.

GOVERNMENT SUPPORT

This invention was made with government support under CBET-1510281 from National Science Foundation. The government has certain rights in the invention.

BACKGROUND

Various optical sectioning techniques have provided pathologists and clinicians with some ability to image biological samples noninvasively at or below a surface of a target specimen, such as the skin of a person. Existing methods for optical sectioning include confocal microscopy, which is the most common method. Confocal microscopy works by passing received light through a pinhole, which rejects out-of-focus light from reaching a detector. Another optical sectioning method, known as structured illumination microscopy (SIM), does not require the use of a pinhole. SIM has an advantage over confocal microscopy because SIM can use wide field imaging and eliminate the need to raster scan.

In SIM, a high-frequency pattern may be used to modulate a plane of interest. Decoupling of in-focus light from out-of-focus light for a given image is achieved by phase shifting the modulation pattern to at least three different positions and then pair-wise subtracting them from one another. Accordingly, three different images are sequentially acquired at different modulation pattern phases to be able to achieve decoupling for a given image produced by SIM. Traditional SIM has also been extended to decouple in-focus and out-of-focus light based on acquisition of two different images.

SUMMARY

The existing methods for optical sectioning are inadequate, in part because they require multiple image samples to be acquired over time, making in-vivo imaging difficult and otherwise limiting optical sectioning to cases in which a subject specimen to be imaged (target) remains very stationary with respect to an imaging device. While confocal microscopy provides sectioning, it rejects a disproportionately large amount of light, requiring a high-power source of light in order to function properly. Additionally, because the pinhole only allows a single pixel or limited group of pixels to be imaged at a time, raster scanning is required to build a full two-dimensional image. This raster scanning takes time, and any movement of a patient or other target object to be imaged can significantly impair the ability of confocal microscopy to produce a proper image of high resolution. While structured illumination microscopy (SIM) does not require the use of a pinhole, nor raster scanning, the need to acquire at least three images in order to decouple in-focus light from out-of-focus light for a single, optically sectioned image also requires time, resulting in difficulties and inaccuracies for in-vivo imaging and other applications where there is potential motion of the target object or within the target object to be imaged.

Furthermore, because SIM requires alignment of images taken with three different structured illumination phases, small differences in optical path length can introduce strong artifacts, particularly at depth in a target object. Moreover, while attempts have been made to extend SIM to require only two images to be acquired for decoupling out-of-focus light from in-focus light, this technique still suffers the disadvantages of requiring multiple image samples, as well as processing of the two samples in connection with each other, to produce a single sectioned image, with all of the attendant disadvantages described above.

Described herein are methods, systems, and devices for optical sectioning that overcome the disadvantages of existing methods by using a single image. In particular, only a single structured illumination modulation phase is required to produce optical sectioning, even at depth. A single image can provide axial information about the specimen and even increase contrast. No alignment or registration of different images is required for three different structured illumination phases, as is required in SIM. Furthermore, embodiments described herein have significant advantages over both SIM and confocal microscopy in that the acquisition time to create a single decoupled image need not be appreciably longer than the acquisition time for a single image (i.e., the time required to acquire a single camera frame), for example. Using embodiments described herein, subsurface objects can be sectioned through even a turbid medium, providing better contrast and resolution than traditional three-phase SIM at depth and a revolutionary method for in-vivo imaging, for example.

In one embodiment, a method of optical sectioning includes capturing an image of a target scene having a structured illumination applied thereto, with the structured illumination having a spatial frequency. The method also includes estimating an out-of-focus component of the image using the spatial frequency, subtracting the out-of-focus component of the image from the image itself to obtain an in-focus component of the image, and demodulating the in-focus component of the image to obtain a sectioned image of the target scene.

Capturing the image of the target scene may include capturing the image at a time instance. Capturing the image may also include imaging a scene under an optically turbid medium. The optically turbid medium may be at least one of animal or human tissue, animal or human skin, cells, fluid, and an integrated circuit. Capturing the image may further include applying a structured illumination that is ultraviolet, visible, or infrared in wavelength; or applying a partially coherent or incoherent structured illumination.

Estimating the out-of-focus component of the image may include applying a notch filter to the image, with the notch filter having a filter frequency substantially equal to the spatial frequency of the structured illumination. Furthermore, the spatial frequency of the structured illumination may be determined from the image itself. The image captured with the structured illumination applied thereto may be a first image, the method further including capturing a second image of the target scene without the structured illumination applied thereto, and estimating the out-of-focus component of the first image further includes using the second image.

Spatially demodulating the in-focus component may include applying a demodulation selected from the group consisting of a Hilbert transform, a spiral Hilbert transform, and a Wiener filter to the in-focus component. Capturing the image may further include capturing light from the target scene using collection optics with a numerical aperture. Spatially demodulating the in-focus component to obtain the sectioned image may include obtaining a sectioned image with a focal distance less than or equal to the numerical aperture divided by a wavelength of the structured illumination light used to illuminate and modulate the target scene.

The method described above, or a separate method, may further include capturing a plurality of images of the target scene having the structured illumination applied thereto, estimating a plurality of respective out-of-focus components of the respective plurality of images using the spatial frequency, subtracting the respective out-of-focus components from the respective plurality of images to obtain a plurality of respective in-focus components of the respective plurality of images, and spatially demodulating the plurality of respective in-focus components to obtain a plurality of respective sectioned images of the target scene at respective depths of focus, with the plurality of respective sectioned images being combinable to form a three-dimensional image or a color image of the target scene.

In another embodiment, an optical sectioning system includes an imager that is configured to capture an image of a target scene having a structured illumination source applied thereto, with the structured illumination having a spatial frequency. The system further includes a processor or other optical sectioning module in operative communication with the optical sectioning system, the processor or other optical sectioning module being configured to estimate an out-of-focus component of the image using the spatial frequency, subtract the out-of-focus component of the image from the image to obtain an in-focus component of the image, and to demodulate the in-focus component of the image spatially to obtain a sectioned image of the target scene. Estimating the out-of-focus component of the image, subtracting the out-of-focus component of the image from the image to obtain the in-focus component of the image, and spatially demodulating the in-focus component of the image using the spatial frequency to obtain a sectioned image of the target scene may be performed by an estimator, image subtractor, or demodulator, respectively, of the processor or other optical sectioning module.

The imager and the processor or other optical sectioning module may be further configured to perform operations as described above.

In yet another embodiment, an optical sectioning system includes means for capturing, or an optical sectioning device includes means for receiving, an image of a target scene having a structured illumination source applied thereto, with the structured illumination source having a spatial frequency. The optical sectioning system or device further includes means for estimating an out-of-focus component of the image using the spatial frequency, means for subtracting the out-of-focus component of the image from the image to obtain an in-focus component of the image, and means for spatially demodulating the in-focus component of the image to obtain a sectioned image of the target scene. Additional features may be employed as described above.

In still a further embodiment, a method of optical sectioning includes estimating an out-of-focus component of an image of a target scene using a spatial frequency, with the image having been captured with structured illumination applied thereto, and the structured illumination having the spatial frequency. The method further includes subtracting the out-of-focus component of the image from the image to obtain an in-focus component of the image, as well as spatially demodulating the in-focus component of the image to obtain a sectioned image of the target scene. Additional features may be employed as described above.

In yet another embodiment, an optical sectioning device includes memory configured to store an image of a target scene, the image captured with structured illumination from a structured illumination source applied thereto, the structured illumination having a spatial frequency. The device further includes a processor or other optical sectioning module communicatively coupled to the memory and configured to: estimate an out-of-focus component of the image using the spatial frequency, subtract the out-of-focus component of the image from the image to obtain an in-focus component of the image, and spatially demodulate the in-focus component of the image to obtain a sectioned image of the target scene. Additional features may be employed as described above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 15 is a red green blue (RGB) map of the three images used in FIG. 14D (three-phase optical sectioning) presented to show human target motion from frame to frame of the three images.

FIGS. 16A-16C show images of a human hair, comparing an un-sectioned image, an image produced using traditional SIM three-phase sectioning, and an image produced by embodiment single-image sectioning.

FIGS. 17A-17B show three-dimensional images created from a Z stack with multiple focal depths for the hair of FIGS. 16A-16C, comparing the three-phase traditional imaging result (FIG. 17A) with the result of embodiment single-phase, 3D imaging (FIG. 17B).

FIGS. 18A-18B are maximum intensity projection images illustrating results for three-phase SIM traditional imaging of the human hair of FIGS. 16A-16C (FIG. 18A) with the results of embodiment single-phase optical sectioning (FIG. 18B).

DETAILED DESCRIPTION

Figure 1A:
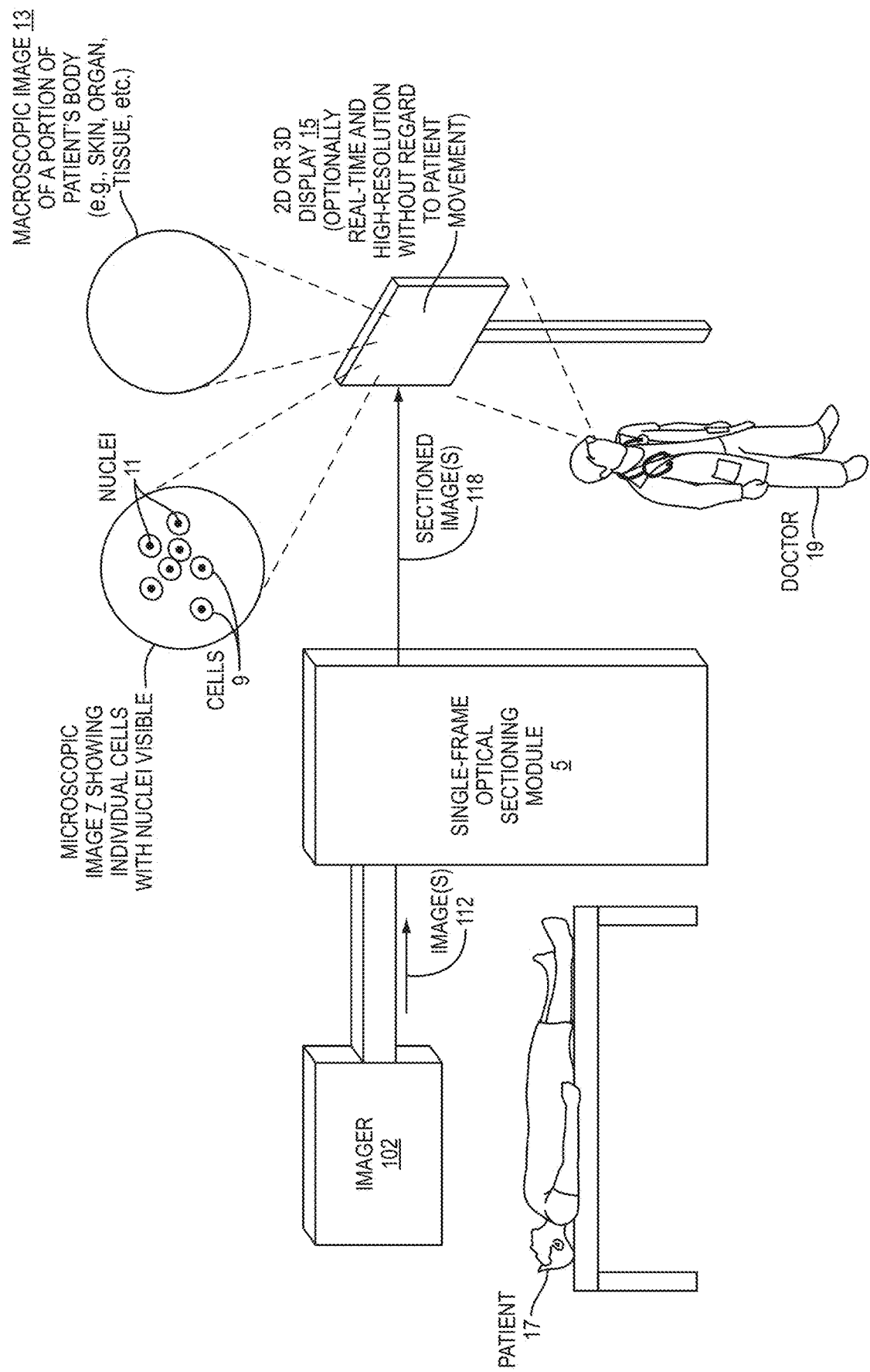
FIG. 1A is a schematic diagram illustrating a medical environment use of an embodiment imaging system.

A description of example embodiments follows.

Disclosed herein are embodiment methods, systems, and devices that enable confocal-like optical sectioning in real time. A single N×M pixel sample may be used to produce an optical sectioned image, and imaging may be time-limited only by a frame rate of an imager, such as a CCD camera. Consistent with embodiments, target samples can be sectionally imaged at physiologically relevant timescales, for example. This is in contrast to traditional confocal microscopy and traditional structured illumination, which typically require either sequential scanning of N×M pixels or at least three frames of data, respectively. Disclosed embodiments can also produce more robust sectioning within a turbid medium than a traditional structured illumination.

Optical sectioning has provided pathologists and clinicians the ability to image biological samples noninvasively at or below a surface of the sample. In example cases such as skin cancer, malignant cells are often located below the stratum corneum, a layer of quantified epithelial cells that occludes living subsurface cells. In this example application, occlusion makes it difficult for a pathologist to determine the health of cells without excising the cells for further analysis. Sectioning may be used to build a depth map of a target specimen, measuring axial information and providing a three-dimensional or tomographic map, giving depth information about subsurface objects. Additionally, optical sectioning produces higher contrast images by rejecting light scattered from out-of-focus planes.

As used herein, "image" refers to a representation of a scene prior to a sectioning process, such that the representation includes both light that is in focus from a sectioning plane in or on a target that is desired to be imaged, as well as light that is out of focus from other planes in or on a target and at different depths of focus than the sectioning plane. "Raw image" or "full image" may also be used herein to convey the same meaning as "image." In contrast, as used herein, "sectioned image" refers to a representation of the scene after processing of one or more raw images acquired by an imager, such the representation includes only light from the sectioning plane (or a reasonable sectioning thickness) that is in focus.

The most common existing method of optical sectioning is confocal microscopy. Confocal microscopy functions by passing light that is received through a pinhole, which rejects out-of-focus light from reaching a detector. A disadvantage of confocal microscopy is that, while it does produce sectioning, it also rejects a disproportionately large amount of light, requiring a high-powered light source in order to be performed properly. Additionally, because the pinhole only allows a single pixel or small grouping of pixels to be imaged at a time, raster scanning is required to build a full, two-dimensional image.

A more recently developed method of optical sectioning is known as structured illumination microscopy (SIM). SIM does not require the use of a pinhole, and it has the advantage of using a wide-field imaging technique, eliminating the need to raster scan, as required for confocal microscopy. In SIM, a high-frequency pattern is used to modulate the plane of interest. Optical sectioning is achieved by decoupling the AC light (which is in-focus) from the DC light (which is out-of-focus) of a given image. As used herein, "AC light," which is in-focus at a given sectioning plane where the structured illumination pattern is focused, should be understood to mean light that is spatially modulated. Further as used herein, "DC light" should be understood to include light from a sample that is imaged that originates from planes not corresponding to the sectioning plane, and which is not modulated as the sectioning plane is in the recent structured illumination microscopy. In these more recent SIM techniques, decoupling between AC light and DC light is typically achieved by phase shifting the modulation pattern to at least three different positions and then pair-wise subtracting them from one another.

A significant disadvantage of both confocal microscopy and SIM is that they require multiple samples over a period of time to produce sectioning, making in vivo imaging, for example, difficult. Furthermore, because SIM requires alignment of three different phases, small differences in optical path length can introduce strong artifacts, particularly at depths (below a front surface of a target object, as viewed by an imager) as will be further described hereinafter.

Nadeau et al. attempted to remedy the deficiencies of SIM by using a specialized two-dimensional Hilbert transform. Nadeau used two images in order to decouple the AC and DC light signals from one another. (Nadeau, et al., "Advanced demodulation technique for the extraction of tissue optical properties and structural orientation contrast in the spatial frequency domain," *Journal of Biomedical Optics*, 19(5):056013-056013, (2014). However, the technique of Nadeau is still deficient because it requires more than one image for a given optical section, providing the possibility for artifacts to be produced by movement of a sample specimen during imaging. The additional computer processing related to acquiring and comparing multiple images is a disadvantage of Nadeau, as it is for SIM.

Embodiments described herein can produce optical sectioning and depth information with the smallest number of samples (e.g., one sample). This can provide a significant advantage over methods such as confocal or conventional structured illumination, whose limitations make clinical in vivo imaging time prohibitive. More specifically, any need for multiple samples to produce sectioning makes in vivo or live biological imaging particularly difficult, because motion during sampling (i.e., between samples) can introduce artifacts. As described herein in connection with embodiments, only a single-phase is necessary to produce sectioning at depth, providing axial information about a target specimen and increasing the contrast. As used herein, "sectioning" refers to optical imaging at a given focal depth within a target specimen.

As further described herein, in connection with embodiments, Hilbert demodulation, for example, may be applied as one technique to perform sectioning on a micron scale, for example. Furthermore, disclosed embodiments need not use three or even two images to produce an optical section, but instead enable single shot optical sectioning. Embodiments can produce images at subsurface locations of objects even through turbid media, generating better contrast and resolution than traditional three-phase SIM at depth and facilitating applications such as in vivo skin imaging. However, it should be understood that embodiments disclosed herein may be equally applied to both turbid and non-turbid target media. Nonetheless, some benefits of embodiments over existing imaging techniques are particularly prominent in optically turbid media, such as skin, ground glass, and other light scattering media.

FIG. 1A is a schematic diagram illustrating an environment of use of an embodiment system in a medical operating or examination room for imaging for medical purposes. An imager 102 is configured to acquire one or more images 112 of the patient 17. The one or more images are provided to a single frame optical sectioning module 5, which is configured to estimate an out-of-focus component of an image, subtract the out-of-focus component of the image from the image itself in order to determine an in-focus component of the image, and to demodulate the in-focus component to provide a sectioned image 118 of the patient.

Advantageously, the single frame optical sectioning module 5 may produce a given sectioned image 118 based on a single image frame from the imager 102. The ability to provide a sectioned image 118 based on a single image 112 has significant advantages over prior art systems. Advantages include the ability to produce a sectioned image, optionally in real time and with high resolution without regard to patient movement. Such an image may be displayed on a 2D or 3D display 15 that can be viewed by a doctor 19 or other medical personnel, for example.

In the case of a 2D image, the 2D image may be a single one of the sectioned images 118 produced from a single raw image frame 112. However, also advantageously, in certain embodiments, a 2D image of still higher resolution may be produced including a 2D image of a surface or an internal section of the body of the patient 17 by combining two or more sectioned images. Each of the two or more sectioned images 118 may be produced from a single one of the sectioned images 118, for example. The two or more sectioned images 118 may be combined into a 2D image. Furthermore, in certain embodiments, two or more images 112 may be first combined, then processed in the single frame optical sectioning module 5 and then used to produce a single sectioned image 118 for display. Still further, the display 15 may be configured to provide a 3D display of the patient 17 or portion of the patient 17, where the 3D display is built from a stack of 2D sectioned images 118. Accordingly, a 3D display may be based on a plurality of sectioned images 118, each of which is produced from a single raw image 112 from the imager 102.

The imager 102 and single frame optical sectioning module 5 may be configured to provide one or more sectioned images at a microscopic scale, such as a microscopic image 7 showing individual cells 9, even with nuclei 11 visible in the image. An example of cell and nucleus imaging produced by an embodiment system is described in connection with FIGS. 14A-14D, for example. Alternatively, the system also has flexibility to provide a macroscopic image 13 of a portion of the patient's body, such as skin, an organ, a tissue, etc. Accordingly, the imager 102 may be configured for either microscopic or macroscopic imaging, and the single frame optical sectioning module 5 can produce sectioned images of any size region of the body of the patient 17.

It should be understood that embodiment systems are applicable to a wide variety of different environments of use, not only in medical imaging, but also in imaging of biological samples such as cell cultures, monitoring of chemical samples in manufacturing or research environments, biomedical imaging for manufacturing or research purposes, etc. Furthermore, because sectioned images can be produced independent of motion of the patient with respect to the imager, any motion of the imager with respect to the patient may also be irrelevant to accuracy and resolution of sectioned images, provided that a single frame image is captured within a time in which a time interval during which any relative motion causes negligible blurring. Accordingly, embodiment systems may also be used in which there is a risk of motion of the imager 102 with respect to an image patient or object or sample target, such as in environments in which room vibration or other disturbances are possible. This also includes environments in which the imager 102 may be used on a mobile platform.

Figure 1B:
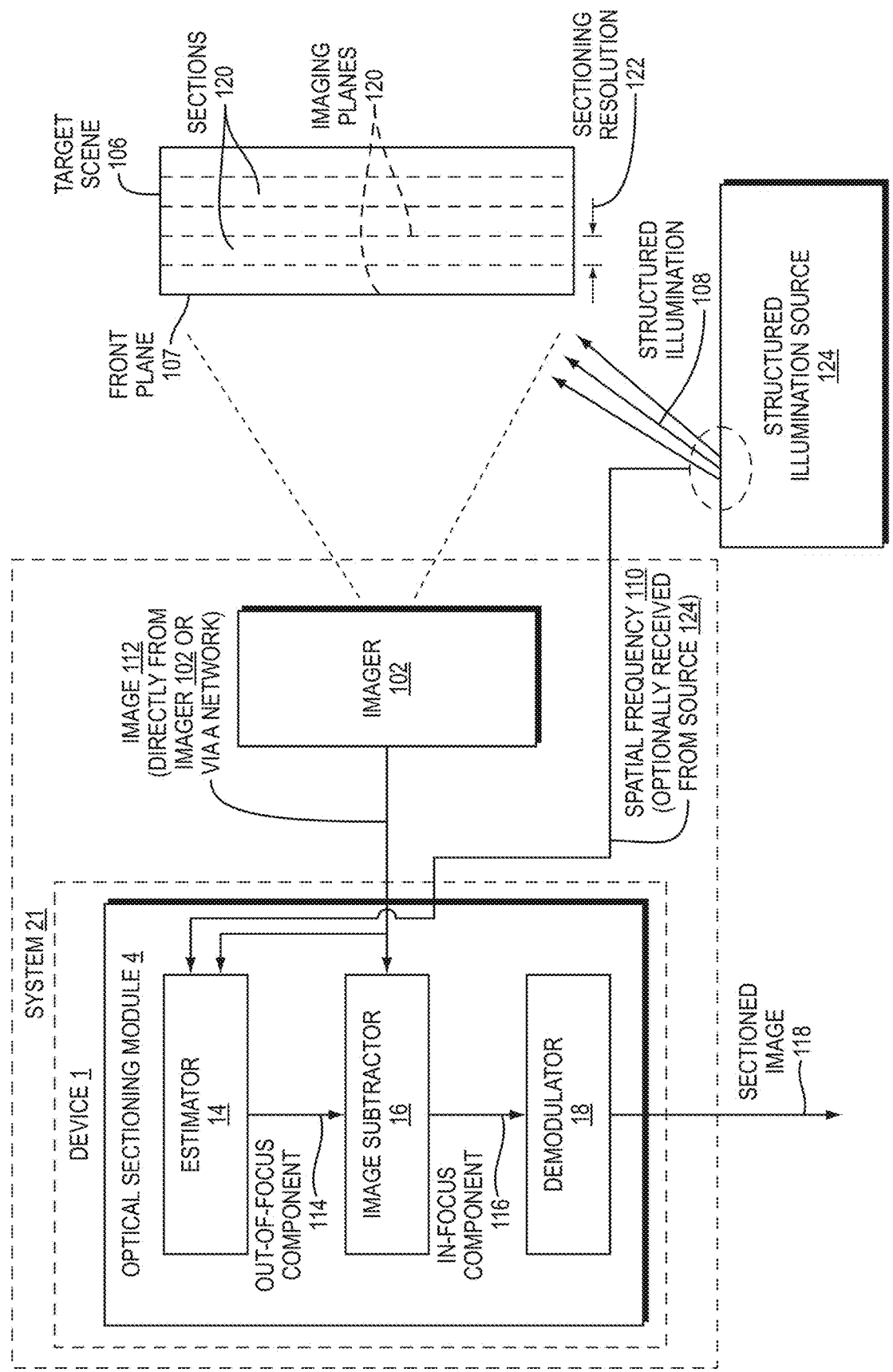
FIG. 1B is a schematic diagram illustrating an embodiment optical sectioning system that includes an imager and an optical sectioning module for producing a sectioned image.

FIG. 1B illustrates an embodiment system 21 that includes an imager 102 and an optical sectioning module 4. In the optical sectioning module 4, there is included an estimator 14, an image subtractor module 16, and a demodulator module 18. The optical sectioning module 4 is configured to receive the image 112 either directly from the imager 102 or via a network. The estimator 14 is configured to estimate an out-of-focus component 114 of the image 112, and this may be done, for example, by frequency analysis of the image, as further described in connection with FIGS. 3B and 4A-4B.

In one embodiment, the estimator 14 may perform a fast Fourier transform (FFT) of the image 112 to determine spatial frequencies that are present. The estimator 14 may determine the out-of-focus component 114 of the image by determining the frequency components of the image that occur at 0 Hz (are constant across the image) or below some given frequency, such as the spatial frequency of the structured illumination at the target. In other embodiments, the background may be generalized. For example, a template may be created by first measuring background and then applying the measured background uniformly to all other data collected. A training set may be built with ground truth and then computationally estimated. This may be estimated from the background information or the applied filter. The contributions of the point spread function/transfer function may be characterized ahead of time, and they may be incorporated into the filter and used to estimate the background.

The image subtractor module 16 then subtracts the out-of-focus component 114 from the image 112 in order to determine the in-focus component 116 of the image 112.

Once the in-focus component 116 of the image is determined by the image subtractor, the demodulator module 18 may demodulate the in-focus component 116 in order to produce the sectioned image 118, without image components that are not in-focus (substantially outside of the intended imaging plane). To demodulate, a way to estimate the phase and frequency of the modulation pattern is used. The Hilbert transform, for example, can be used for this with one phase.

Formulation of the image in the spectral domain is preferable to formulation in the image domain, as this is where discrimination between the in-focus and out-of-focus components is best realized. This formulation may be expressed as:

$$I_n(k) = H(k)\left(\Gamma(k) + \frac{\alpha}{2}\Gamma(k-\rho)e^{+2i\pi\phi_m} + \frac{\alpha}{2}\Gamma(k+\rho)e^{-2i\pi\phi_m}\right) \quad (0)$$

The image $I_n$ in equation (0) represents the nth image taken. Here, H(k) is the transfer function, which represents the physical limitations of the optical system to pass frequencies to the detector (a low-pass filter in simplest form). Within the parenthesis are three delta functions (separated by the addition signs), represented by capital gamma. These represent the out-of-focus signal $\Gamma(k)$, and the modulated side bands containing the in-focus signal $\Gamma(k-\rho)$ and $\Gamma(k+\rho)$. The letter p defines the offset in position in the Fourier domain, which is the frequency of the modulation pattern. The phase of the modulation pattern is captured in $\phi_m$.

Equation (0) shows three discrete components. When estimating the DC component (the out-of-focus light), a hypothesis may be made about what $\Gamma(k)$ looks like. The more accurate the hypothesis, the better the sectioning results will generally be. Generally, this be done by guessing at $\Gamma(k-p)$ and $\Gamma(k+p)$ and removing them (i.e., by a notch filter). Typically, these are represented by two upside down Gaussian functions, placed at the positions +/-$\rho$. Once multiplied by the filter, an estimation of the out-of-focus $\Gamma(k)^*$ is left. Thus, the in-focus signal is $I_n(k)-\Gamma(k)^*$. After this operation is complete, two left over I' values may be modulated (i.e. they are at positions k-$\rho$ and k+$\rho$, but we need to shift these back down to $\rho$. It is at this point that the Hilbert transform function may be used. This function creates a phase-shifted version of the signal by ignoring the conjugate component k-$\rho$. The two signals can then be recombined as described in equation (6).

Equations for the Gaussian signals that may be used to generate a notch filter may then be created in some cases, but other filtering techniques may also be used. The shape of notch filters used in embodiments may be as complicated as necessary to be effective. Here, it is shown that a Gaussian is good enough for a proof of concept, but the technique can be extended to other filtering methods.

This technique generalizes the problem in one dimension. It can be extended in view of this disclosure to the 2D case by setting the dependencies to $I_n(u,v)$, rather than $I_n(k)$, and a directional phase vector r in the exponent. However the process is analogous.

Other methods may be used for three phases, as described herein in relation to traditional SIM. Furthermore, in some embodiments, interference with a reference beam may be used to measure phase. There are also various computational methods that may be employed to estimate the phase and frequency within an image.

As used herein, a "system," such as the system 21 in FIG. 1B, includes an imager and performs the imaging function of the imager 102, as well as estimating, image subtracting, and demodulating functions of the optical sectioning module 4. The imager 102 may be in close proximity with the optical sectioning module, or may be part of the same physical structure embodied in an imaging machine such as the imager 102 and single-frame optical sectioning module 5 of FIG. 1A, for example. Alternatively, the imager 102 may be remote from the optical sectioning module 4, and the optical sectioning module may receive the image 112 via a communication link, such as a network. This flexibility enables an optical sectioning module to be operated in the cloud, at a network server, for example, that includes no raw imaging capability of an imager. Images 112 may be received from remote imagers that image target scenes with structured illumination applied thereto, as described herein. Accordingly, an optical sectioning module in a cloud server, for example, may produce sectioned images 118 with a subscription service, for example, with raw images 112 uploaded to the server and sectioned images downloaded from the server.

Also illustrated in FIG. 1B is a device 1 that encompasses the optical sectioning module 4. Embodiment devices should be understood to be able to accept images and act on them to produce sectioned images as is done in the optical sectioning module 4, using the estimator 14, image subtractor 16, and demodulator 18, for example. Accordingly, in certain embodiment devices, images 112 may be provided to the device and not obtained by the device itself. Furthermore, embodiment devices including an optical sectioning module may be implemented in software that is run by a processor, as described in connection with FIG. 1C, or in firmware, a field programmable gate array (FPGA), and the like.

The demodulator 18 is configured to demodulate the in-focus component 116 of the image spatially using the spatial frequency 110 of the structured illumination 108. The spatial frequency 110 is described further in connection with FIG. 19B, for example. The spatial frequency 110 is optionally transmitted from the structured illumination source 124 and received by the optical sectioning module 4 and estimator 14. In these embodiments, the spatial frequency of the structured illumination 108 applied to the target scene is known and provided to the estimator 14. However, in other embodiments, the estimator 14, or another portion of the optical sectioning module 4, may determine the spatial frequency 110 based on the content of the image 112. The estimator may analyze frequencies present in a map such as those illustrated in FIG. 4A, for example, and determine the spatial frequency 110 of the structured illumination based on one or more dominant spatial frequencies other than 0 Hz that may be present in the image. Also described hereinafter in connection with FIG. 3B is a power spectral density (frequency spectrum) of an example 1D signal. The spatial frequency of the structured illumination light may be readily determined by peaks present in the 1D signal. Further, this technique may be readily applied to a frequency spectrum representing a 2D image, such as the frequency spectrum of FIG. 4A.

Figure 1C:
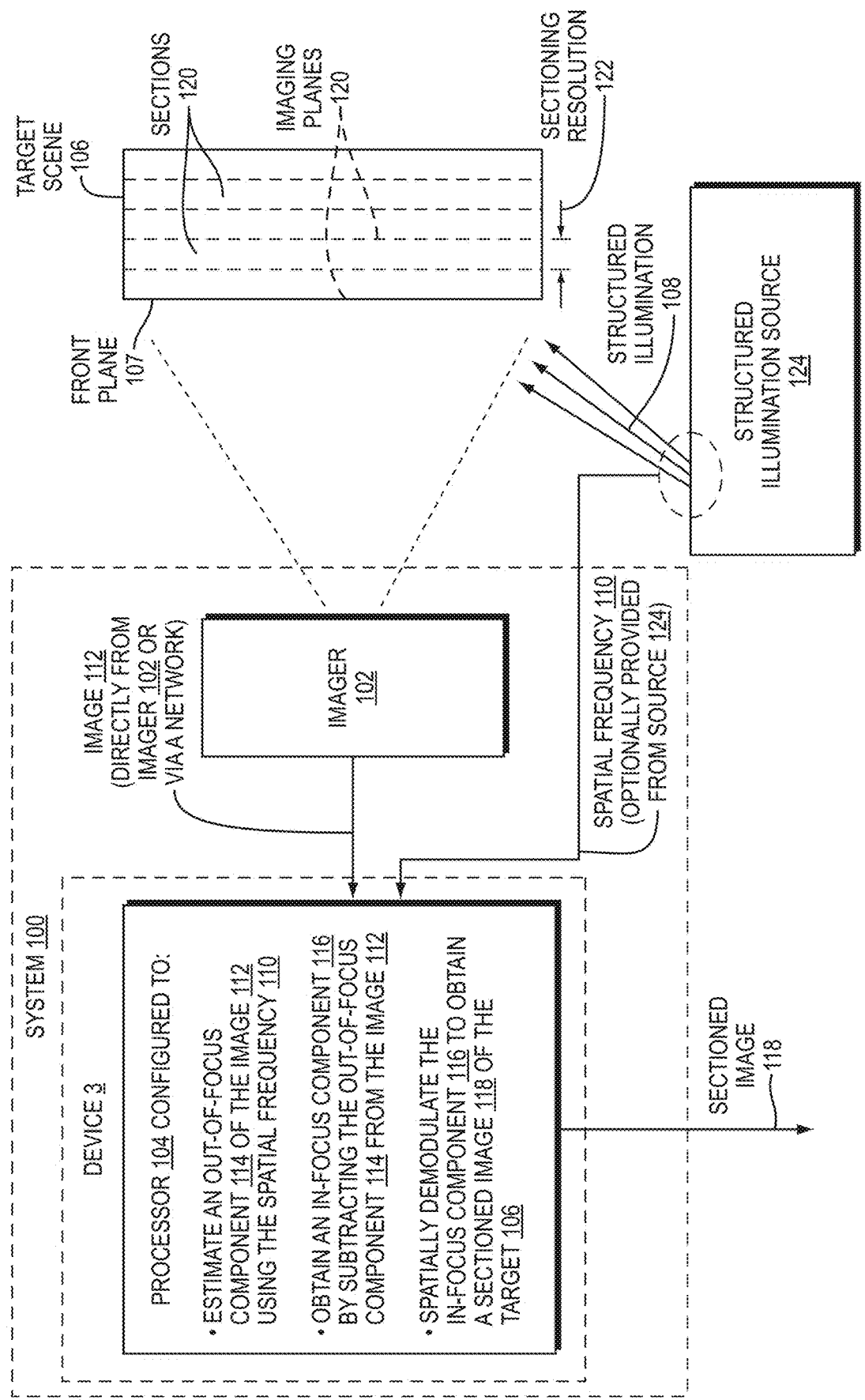
FIG. 1C is a schematic diagram illustrating a particular embodiment optical sectioning system in which a computer processor is used to implement functions of the optical sectioning module of FIG. 1B.

FIG. 1C is a schematic diagram illustrating an optical sectioning system 100. The system 100 includes an imager 102 and a processor 104. The imager is configured to capture an image 112 of a target scene 106 having a structured illumination 108 from a structured illumination source 124 applied thereto. The structured illumination 108 has a spatial frequency 110 at the target scene 106, particularly at an imaging plane 120 where the illumination 108 is focused. The spatial frequency is described further in connection with FIG. 19B. The spatial frequency 110 may be expressed in terms of distance, namely frequency is equal to a number of modulation cycles of the structured illumination along a particular section of the target scene 106, divided by the width of the particular section of the target scene. The spatial frequency may also be expressed as 1 divided by the period of the structured illumination. The spatial frequency 110 may be expressed in inverse millimeters or other inverse spatial units, such as in inverse pixels of the imager 102.

The processor 104 is configured to perform several functions in order to obtain a sectioned image 118 of the target scene 106. In particular, the processor 104 is configured to estimate an out-of-focus component 114 of the image 112 using the spatial frequency 110. The processor 104 further is configured to subtract the out-of-focus component 114 from the image 112 in order to obtain an in-focus component 116 of the image 112. The processor 104 is still further configured to demodulate the in-focus component 116 of the image spatially to obtain the sectioned image 118 of the target.

The target scene 106 should be understood to be a target with a depth extent that is defined by various virtual sections 120. The virtual sections 120 are depth layers of the target scene 106 that may generally be in-focus or out-of-focus of the imager 102, depending on optical settings.

The general task of the imager 102 is to obtain the sectioned image 118, namely an image, which should be understood to be an image nominally covering one of the virtual depth sections 120, such that components of the image 112 that are in-focus (corresponding to a given section 120) are preserved in the sectioned image 118, while other components of the image 112 that are out-of-focus (corresponding to sections 120 other than the given section) are excluded from the sectioned image 118. Accordingly, the sectioned image 118 is an image of a given depth section 120 of the target scene 106. In real systems, this sectioned image 118 does not cover an infinitely narrow section 120, but instead the section 120 covered by the sectioned image 118 has some depth, which is referred to herein as a sectioning resolution 122. In some embodiments, the sectioning resolution may be on the order of for example. Accordingly, in the 3D depth map images described in connection with FIGS. 7A-7B, for example, individual optical sectioned images forming the depth maps were collected with 1 μm depth increments between the sectioning planes for individual sections.

As will be understood by those skilled in optics, the sectioning resolution of an imaging system such as the imager 102 is an extent of depth over which a given image resolution is maintained. For the system and target illustrated in FIG. 1C, for example, image resolution, or image quality (spatial frequency, for example, at a specified contrast), may be maintained within a given section 120, yet not maintained outside of the given section 120 with sectioning resolution 122. While the imager 102 may, in general, collect light from multiple sections 120 depth sections 120, the sectioned image 118 corresponds to a given section 120.

Figure 2:
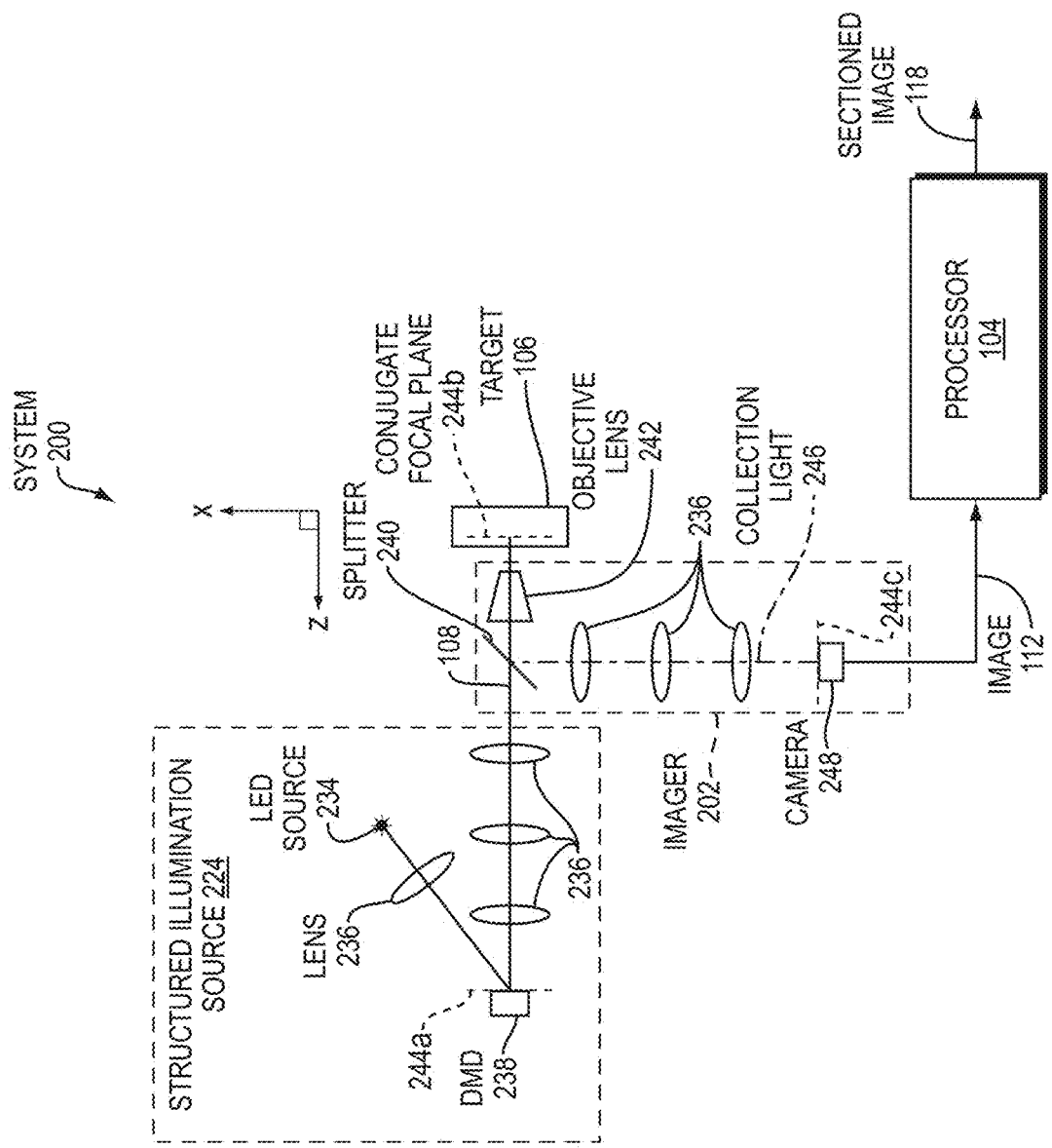
FIG. 2 is a layout diagram for an embodiment optical sectioning system used to acquire and process images illustrated and described in the application.

FIG. 2 is a schematic illustration of an embodiment system 200 that is configured for optical sectioning. While some portions of the system 200, including the structured illumination source 224 a structured illumination source 224 and an imager 202 may be used in traditional SIM measurements, the system 200 further includes the processor 104 that is illustrated and described in connection with FIG. 1C. The specially configured processor 104 enables the system 202 produce a sectioned image using only a single raw image from the imager 202.

In the system 200, the structured illumination 124 is achieved by projecting high-frequency, spatially patterned light, onto a target specimen 106 from a structured illumination source 224. The structured illumination source 224 and camera based imager 202 were used to produce the results that are described hereinafter. The high-frequency spatial pattern of light lies on a plane 244a at a mirror surface of a digital micromirror device (DMD) 238 that is conjugate to both an imaging plane 244a of a CCD camera 248 that is part of the imager 202 and a discreet conjugate focal plane 244b at the target specimen 106. In FIG. 2, the focal plane 244b is shown at depth within the target 106. The conjugate focal plane 244b at the target specimen 106 is oriented in the XY plane, with structured illumination light 108 received along the Z axis, where the coordinate system is illustrated in FIG. 2.

The structured illumination source 224 particularly includes an LED source 234, focused by a lens 236 onto the DMD 238 with a focal plane 244a. The DMD 238 can provide high-speed, efficient, and reliable spatial light modulation. The DMD 238 reflects the structured illumination light 108 through a series of lenses 236 and an objective lens 242 of the imager 202 (after passing through a splitter 240) and into the target specimen 106 at a conjugate focal plane 244b. In other embodiments, spatial modulation of structured light may be provided by Ronchi gratings or other means.

The camera 248 of the imager 202 receives light from the target specimen 106 through the objective lens 242. The collection light 246 is reflected by the splitter 240 and directed through a series of conditioning lenses 236 and onto a conjugate focal plane 244c of the camera 248. The image 112 is output from the camera 248 and then processed by the processor 104 according to the processing described in connection with FIG. 1C to produce the sectioned image 118. As will be understood, the structured illumination source 224 and imager 202 may have many different configurations that are not illustrated in the drawings but will be readily understood by those skilled in the art of structured illumination.

Structured Illumination-Conventional Approach

Consistent with the structured illumination source 224 and imager 202 illustrated in FIG. 2, conventional SIM uses structured illumination to achieve spatially patterned light by projecting high-frequency, spatially patterned light onto a target specimen. The pattern lies on a plane conjugate to both the CCB camera and a discreet plane of focus at the target specimen. As a result, light scattered from the in-focus plane is modulated, separating it from the out-of-focus light. Separating these two components allows for removal of unwanted light from regions in front of and behind the plane of interest.

In FIG. 2, the plane of interest is the conjugate focal plane 244b in the target specimen 106. As a practical matter, optical sectioning is never at a hypothetical single plane, but covers a small depth section (sectioning resolution), such as the width of one of the sections 120 (sectioning resolution 122) of the target scene 106 illustrated in FIG. 1C. Separation of unwanted components is particularly accomplished in traditional SIM by measuring a total of three images, typically with structured illumination applied with phases 0°, 120°, and 240° to the target, followed by processing them with a differencing technique, as follows:

$$I_{AC} = \sqrt{(I_{0°} - I_{120°})^2 + (I_{0°} - I_{240°})^2 + (I_{120°} - I_{240°})^2} \quad (1)$$

where I is a 2D array of the lateral coordinates x and y.

Spatial Frequency Domain Imaging (SFDI) Using Hilbert Transform

As described hereinabove in part, Nadeau revised traditional SIM to perform spatial frequency domain imaging (SFDI), a technique using two images to produce an optical sectioned image. Similar to SIM, SFDI functions by modulating an image with a known frequency and phase. SFDI works to separate the absorption coefficient $\mu_a$ and reduced scattering coefficient $\mu'_s$ of a material, which have differing sensitivity to the spatial frequency of the projected structured illumination light. As a result, $\mu_a$ and $\mu'_s$ can be decoupled using the DC and AC portions of the signal, respectively. (See, e.g., Thomas D. O'Sullivan, et al., Diffuse optical imaging using spatially and temporally modulated light. Journal of biomedical optics, 17(7):0713111-07131114, 2012. David J. Cuccia et al. Modulated imaging: quantitative analysis and tomography of turbid media in the spatial-frequency domain. Opt. Lett, 30(11):1354-1356, 2005. David J. Cuccia et al. Quantitation and mapping of tissue optical properties using modulate imaging. Journal of biomedical optics, 12(2):024012-024012, 2009.) SIM uses the same principle to decouple in-focus and out-of-focus light. It should be noted that while Nadeau focuses on determination of scattering and absorption coefficients using two images, embodiments described herein may be used for optical sectioning, which often entails use of much higher numerical aperture values and much higher spatial frequencies of structured illumination patterns. This is particularly true in the case of embodiments applied to microscopic optical sectioning applications, for example.

Conventional SFDI requires three phases to be measured along with one image without modulation, for a total of four images. More recent advances in signal processing and SFDI have produced a method of demodulating an image of an unknown phase, frequency, and angle, through the use of a 2-D covert transform. Developed by Larkin et al. (Larkin Kieran G. Donald J. Bone Michael A. Oldfield, Natural demodulation of two-dimensional fringe patterns, i. general background of the spiral phase quadrature transform, JOSA, 18(8):1862-1870, 2001; Larkin Kieran G., Natural demodulation of two-dimensional fringe patterns, ii. stationary phase analysis of the spiral phase quadrature transform, JOSA, 18(8):1871-1881, 2001), a spiral function is applied to demodulate a 2-D fringe pattern of unknown frequency and phase. In the two-dimensional case, the Hilbert transform may be applied using the spiral function, where u and v are positional indices within the frequency domain, $$S(u, v) = \frac{u + iv}{\sqrt{(u^2 + v^2)}}, \quad (2)$$

The Hilbert transform has the benefit of being agnostic to both the frequency and angle of the modulation pattern. This Hilbert demodulation technique was leveraged by Nadeau to perform faster and more accurate SFDI processing. With this method, only two images were required to decouple $\mu_a$ and $\mu'_s$. This was in contrast to the typical four images required by traditional SFDI, as described hereinabove. SIM and SFDI differ in that the modulation pattern exists only within a very discrete plane of focus. For example, the greater the distance from the focal plane, the more the modulation pattern will go out-of-focus. This effectively removes the modulation pattern for these claims that are out-of-focus. As such, the in-focus and out-of-focus regions may be treated as separate, distinct regions. After application of the Hilbert transform, an inverse frequency transform, such as an inverse Fourier transform, may be applied to the sectioned image in frequency space to obtain the sectioned image in image space.

In alternative embodiments, demodulation may include other techniques besides the Hilbert transform, such as use of a Wiener filter applied to the in-focus component of the light captured in an image. An example use of Wiener filters is provided in Mats GL. Gustafsson, Surpassing the lateral resolution limit by a factor of two using structured illumination microscopy, Journal of microscopy, 198(2):82-87, 2000, which is incorporated by reference herein in its entirety. Weiner filters are less preferable because the phase components are generally not known unless three images with three orthogonal phases are taken. However, the phases may be estimated using, for example, interference, demodulation may be applied by spectrally shifting (multiply by a cosine), or extracting these frequency bins and lowering their position back down to baseband. However, due to the discretization of these frequency bins, imperfect reconstruction of the frequency space is possible. The Wiener filter technique may greatly reduced noise when adding two quantized spectral components back together.

One-Dimensional Simulation

FIGS. 3A-3D are graphs illustrating one-dimensional simulation results. These results show how, in a one-dimensional simulation, in-focus light (AC) and out-of-focus light (DC) components from a signal can be isolated from one another. For the simulation, the Hilbert function from MathWorks Matlab® version 2015A is used, and this serves as a suitable stand-in for the spiral function that may be applied in two-dimensional cases described hereinafter.

Figure 3A:
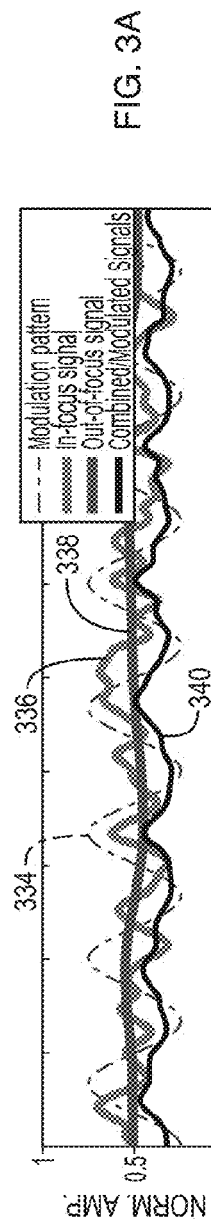
FIGS. 3A-3D are graphs illustrating results for a one-dimensional simulation of embodiment methods for optical sectioning.
Figure 3B:
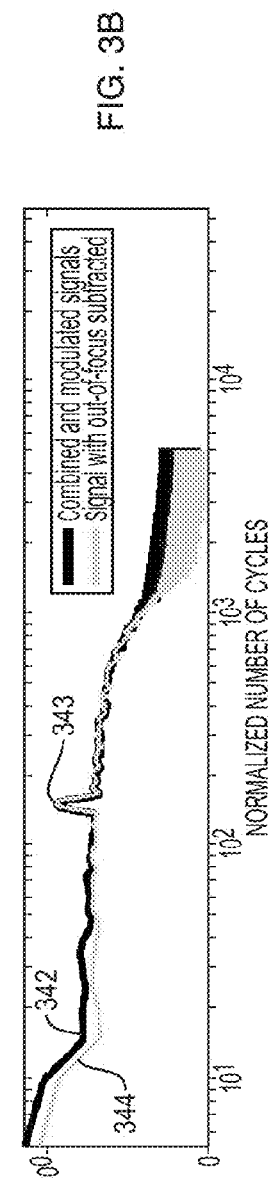

FIG. 3A is a graph showing low-frequency out-of-focus and high-frequency in-focus signals that are combined with a modulation pattern, as described hereinafter in equation (3). In particular, FIG. 3A shows a modulation pattern 334, and in-focus signal 336, and an out-of-focus signal 338, with a combined modulated signal 340 also illustrated.

FIG. 3B illustrates a power spectral density 342 of the measured signal before removing the DC (out-of-focus) component, compared with a power spectral density 344 of the measured signal after removing the DC component. As can be seen in FIG. 3B, a modulation pattern peak 343 is present at approximately 150 cycles per image. Identification of the position of this peak in the frequency spectrum is one way to determine a spatial frequency of the structured illumination using a processor or other optical sectioning module, such that the spatial frequency need not be provided by a structured illumination source or otherwise known for sectioning analysis of an image.

Figure 3C:
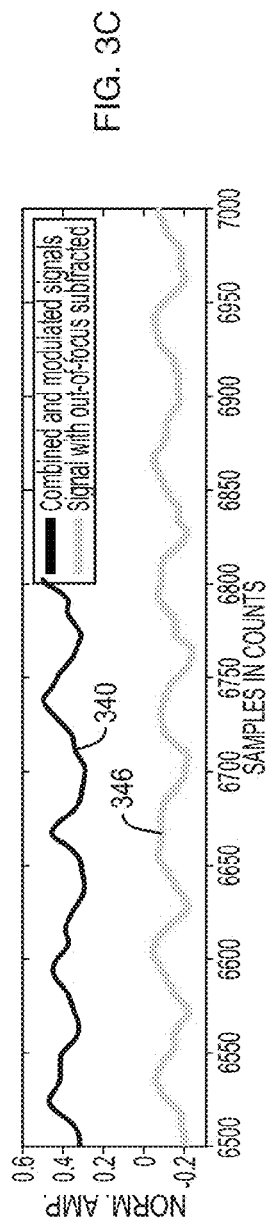

FIG. 3C is a graph showing the time-series data 344 of the signal before subtraction of the out-of-focus component, as illustrated in FIG. 3A, as well as a time-series curve 346 showing the signal after subtracting the out-of-focus component 338 that is illustrated in FIG. 3A.

Figure 3D:
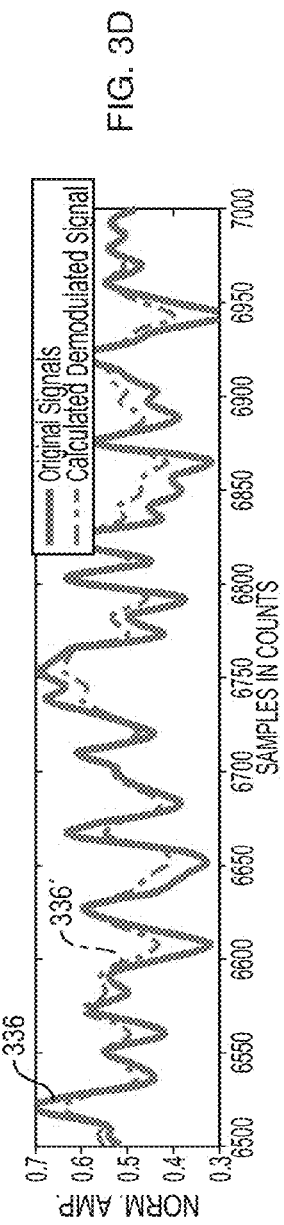

FIG. 3D is a graph comparing the in-focus signal 336 from FIG. 3A with an in-focus signal 336' recovered using the Hilbert transform.

To carry out this example one-dimensional simulation, synthetic data were generated. The synthetic data represent a spatially varying signal in one dimension, a simplified version of example two-dimensional images that are described hereinafter. This spatially varying signal in one dimension will appear in the conjugate plane of a target specimen, such as the plane 244b illustrated in FIG. 2, just beyond the objective 242. A random signal is constructed with a mean of 0.5, which represents the signal that is desired to be extracted from a given focal plane. This random signal is the in-focus signal 336 that is illustrated in FIGS. 3A and 3D. A modulation pattern is constructed as which is the patterned light that is intended to be projected by the structured illumination source 224, particularly the DMD 238 in the example apparatus in FIG. 2. This modulation pattern is the pattern 334 illustrated in FIG. 3A. The modulation pattern 334 represents an irradiance pattern projected onto the sample that has a mean of 0.5 and ranges from 0.25 to 0.75 (shown as the modulation pattern 334 in FIG. 3A).

Independently, a second low spatial frequency, with random pattern is created to represent the out-of-focus light ($R_{OF}$, illustrated as the out-of-focus signal 338 in FIG. 3A). The signal is generated with low spatial frequency, as it represents the background scattered light from regions outside the conjugate plane. Approximately 2% of the modulation is then coupled into the out-of-focus light in the simulation in order to visualize how small errors will impact the final reconstruction. The two signals 336 and 338 are added together to construct the simulated combined signal 340 that is illustrated in FIGS. 3A and 3C. The construction of the signal is completed as illustrated in equation (3):

$$\Gamma(x)=0.5M(x)R_{IF}(x)+0.48R_{OF}(x)+0.02M(x)R_{OF}(x) \quad (3).$$

$\Gamma(x)$ in equation (3) represents the fully modulated signal, which is comprised of the modulated in-focus portion and partially modulated out-of-focus light as the combined modulated signal 340 in FIG. 3A. The modulated, in-focus portion of the signal is recovered in this simulation by subtracting the combined in-focus and out-of-focus signals, without modulation, according to equation (4)

$$\Gamma_{IF}(x)=\Gamma(x)-R(x) \quad (4).$$

where $$R(x)=0.5*(R_{OF}(x)+R_{IF}(x)) \quad (5).$$

The unmodulated portion R(x) can be independently measured without projecting a modulation pattern, as simulated here, or estimated by filtering out the modulation pattern, as described hereinafter. In Eqn. 1.4, the modulated, in-focus portion of the light is produced. The in-focus section can then be reconstructed by using the Hilbert function in Matlab® to modulate the signal as follows:

$$R_{IF}(x)=\Gamma_{IF}(x)+|i\,\mathcal{H}\{\Gamma_{IF}(x)\}| \quad (6)$$

In the corresponding 2D case, $$\mathcal{H}\{\Gamma_{IF}(x,y)\}=\mathcal{F}^{-1}\{\mathcal{F}\{\Gamma_{IF}(x,y)\}*S(u,v)\} \quad (7).$$

with $\mathcal{F}$ representing the Fourier transform and $\mathcal{F}^{-1}$ representing the inverse Fourier transform.

The results illustrated in FIGS. 3A-3D show how the in-focus light can be successfully decoupled from the background. In order to show the accuracy of the technique, FIG. 3D shows the estimated in-focus signal 336' recovered using the Hilbert transform, as compared with the original in-focus signal 336. It should be noted that there is some loss in accuracy due to modulation from some of the out-of-focus regions. This type of error will manifest itself as a loss of contrast, particularly in regions of high spatial frequency. For purposes of the one-dimensional simulation described in connection with FIGS. 3A-3D, R(x) was known and subtracted from the modulated signal. This can be achieved by measuring the signal twice, one measurement with modulation, and one measurement without modulation, for real image acquisition that is performed according to embodiments. However, similar results can also be achieved with only one measurement, as described hereinafter, in embodiments. Rather than measuring the unmodulated signal, it can be estimated by filtering out the unmodulated portion of the image first, followed by subtracting the unmodulated signal from the modulated measurement, for example.

Structured Illumination-Single Image Approach

Structured illumination is capable of isolating a discrete plane of interest from all other out-of-focus planes within a sample. By projecting a high-frequency modulation pattern under planar illumination, at a plane conjugate to the CCD camera, for example, all components of the conjugate plane may be spatially shifted outside the broadband signal. This scattered, out-of-focus light remains centered in the baseband of the spatial frequency domain due to the pattern being blurred outside of the focal plane.

Hereinabove, a method of decoupling in-focus and out-of-focus signals was described, and in view of this disclosure, this method can be readily adapted to 2-D applications by those skilled in the art. As noted hereinabove, it is desirable to perform optical sectioning with the fewest number of samples in order to reduce or eliminate artifacts of motion of a biological sample, for example. In the interest of developing single-image optical sectioning, described herein are embodiments, such as the system 100 in FIG. 1C and the system 200 in FIG. 2, that can perform such single image optical sectioning. Notwithstanding the ability of embodiments to produce single-image optical sections, some embodiments may also optionally estimate background by acquiring a second image without structured illumination applied thereto.

The use of a single sample can be extremely useful in real-time biological imaging. Specifically, motion artifacts can create constraints on any method that requires multiple samples of data for reconstruction, such as traditional SIM, and such as the work of Nadeau. In embodiment systems and methods, provided there is minimal movement within the integration time of a single camera frame, a single sample will suffice in producing high quality sectioned images in vivo, for example. Furthermore, in contrast to three-phase SIM, there is no need to finally align multiple phases of data, making embodiment methods particularly robust at depth.

In the 1-D simulation described in relation to FIGS. 3A-3D, the broadband signal without modulation was directly measured. According to embodiments described herein, only a single image may be measured, with the single image containing both the in-focus and out-of-focus components, as well as the modulation pattern. For example, using a combination of a low-pass filter and a notch filter, which may be defined based on the frequency of the modulation pattern, the low-frequency information from out-of-focus light may be estimated. For the sectioned imaging results described hereinafter, a Gaussian notch filter was used. Specifically, the position, width, and amplitude of the filter are adjusted. However, there are many shapes of filters that may be used in various embodiments. The degree of preferability of a given filter shape depends on amplitude, position, and slopes of the filter edges, as will be understood by those skilled in notch filtering.

Figure 4B:
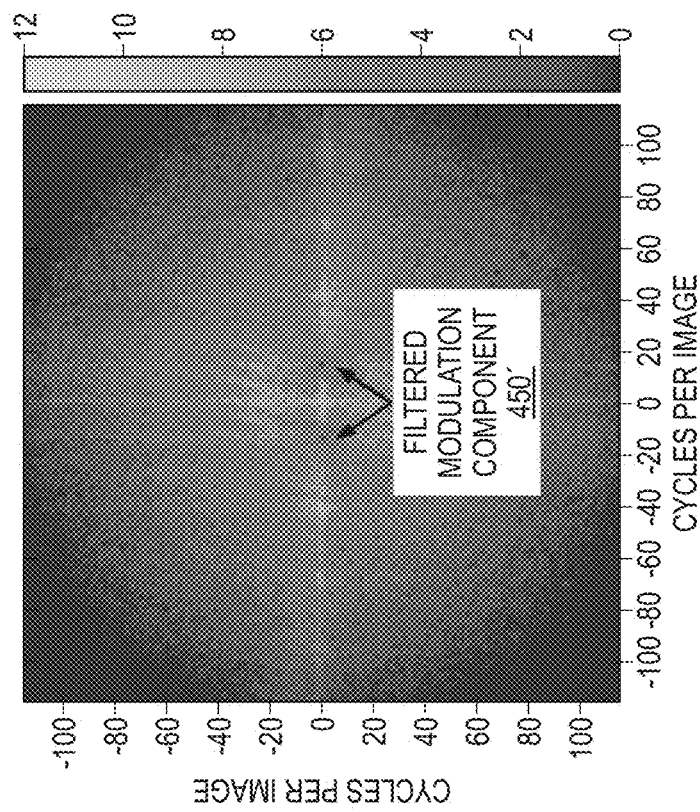
FIGS. 4A-4B are frequency domain maps of a 2D acquired image before and after demodulation using an embodiment method.
Figure 4A:
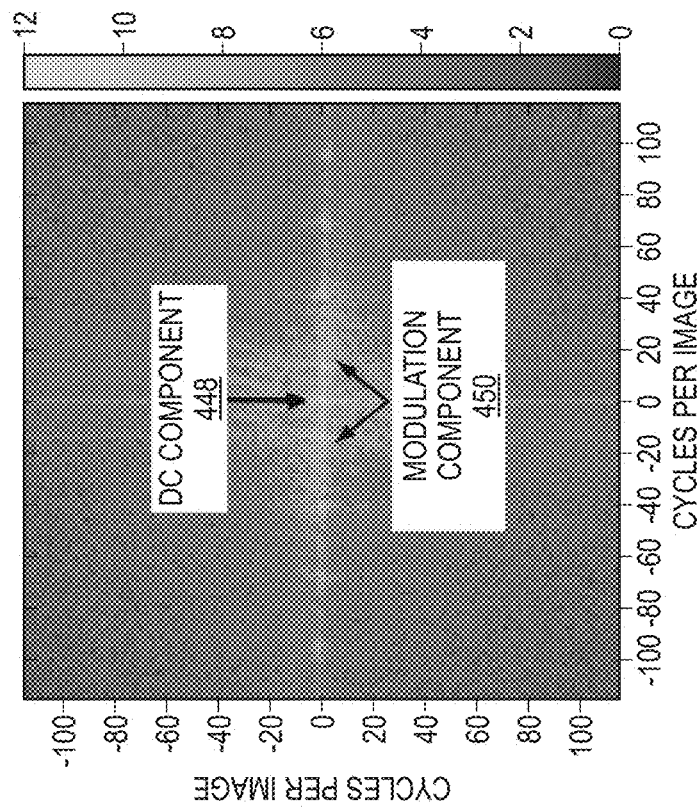

FIGS. 4A-4B help illustrate how a low pass filter and a notch filter can be applied, based on the frequency of a modulation pattern, either known or determined from the image, in order to estimate low frequency information from out-of-focus light. In particular, FIG. 4A is a frequency domain map of a modulated image with structured illumination having a spatial frequency of approximately 15 cycles per image applied. The low frequency dB component 448 is visible in the center of the graph (the origin), while a modulated component 450 is visible along the horizontal axis. The scale color bar at the right of FIG. 4A is in units of dB.

FIG. 4B is also a frequency domain map of the image, with color units in dB, representing the image after a notch and low pass filter have been applied in order to estimate the DC signal. Particularly, filtered modulation components 450' shows up in the map as black dots in place of the modulation component 450 shown in FIG. 4A. The horizontal and vertical axes in FIGS. 4A-4B are in units of cycles per image.

It should be noted that for the example of FIGS. 4A-4B and for other specific examples described hereinafter, a narrow Gaussian filter was applied to eliminate the modulation pattern. However, in various embodiments, the selection of filter may vary depending on the frequency and angle of the modulation pattern applied. The estimated, unmodulated image can be subtracted from the image, leaving only the modulated, in-focus signal, as illustrated in FIG. 4B. As already described, a Hilbert transform may be applied using the spiral function technique to remove the modulation pattern from the in-focus signal. This can result in a sectioned image that has been demodulated. Depending on how well the R(x) is estimated, the success of the demodulation may vary. For example, in some cases, some residual banding may remain if the modulation pattern cannot be completely filtered out. However, embodiment methods and systems provide good sectioning over a wide variety of different types of situations, as illustrated through various results described hereinafter.

Verification

In order to show that embodiment methods and systems provide results comparable to ordinary SIM, it is useful to verify that accurate topographic and tomographic information may be accurately extracted. As used herein, topographic information relates to isolating discrete regions at the surface of an object that are located at different depths. This can result in the ability to build a depth map and increase depth of field for a particular sample. As further used to herein, "tomographic" imaging refers to imaging that functions within a turbid medium. In cases of biological samples, such as in skin imaging, for example, it is desirable to isolate planes of focus located within a sample, planes that would otherwise be occluded from view by scattered light from surrounding layers.

In various examples illustrated hereinafter, a paper card is imaged, which contains multiple layers of paper positioned at various unknown depths. Each single image result is compared against the typical three-phase sectioning method of SIM to ensure the accuracy of results. A wide-field image is also constructed by summing each of the three phase images together. This simulates an image of a target specimen as it would be seen through a conventional microscope without any sectioning. Furthermore, a tomographic phantom is constructed, consistent with Glazowski, Christopher E. James Zavislan, *A coherent model for turbid imaging with confocal microscopy*, Biomedical optics express, 4(4):500-513, 2013. A 1951 Air Force resolution chart is placed 30 μm below a piece of ground glass, which serves as a source of scattering. Between the two planes, ultrasonic gel with an index of refraction of 1.33 is used to simulate water contained within the skin tissue in order to simulate biological imaging.

In various examples described hereinafter, a 635 nm LED with a line width of 17 nm was used as a light source, as part of a structured illumination source. In other embodiments, other structured illumination light sources may be used, including those producing coherent, partially coherent, or incoherent light. Furthermore, besides visible wavelengths, infrared and ultraviolet wavelengths may also be used with appropriate focusing and collection optics and appropriate cameras, detector arrays, or other imager apparatuses. Patterns were projected onto example specimens using a TI LightCrafter™ DMD. Acquired images were then captured using an Allied Vision Guppy Pro F-125 CCD camera as part of an imager. An example objective with a nominal magnification of 10× in air with a numerical aperture of 0.25 was further used as part of the imager, as illustrated in FIG. 2, namely the objective lens 242. When combined with a tube lens, comprising the three lenses 236 illustrated in FIG. 2, the imager 202 had an overall magnification of 9×. In some embodiments, the numerical aperture of the objective may be approximately 0.4, with a 20× magnification and a working distance on the order of 11.0 mm.

Single-Image Results

Figure 5C:
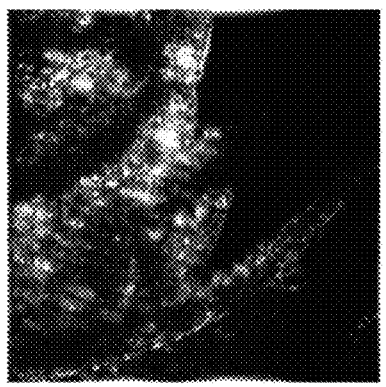
FIGS. 5A-5C are images showing results of imaging a business card at depth, comparing wide-field imaging with no sectioning (FIG. 5A), three-phase existing reconstruction techniques (FIG. 5B), and an embodiment single-image demodulation method (FIG. 5C).
Figure 5B:
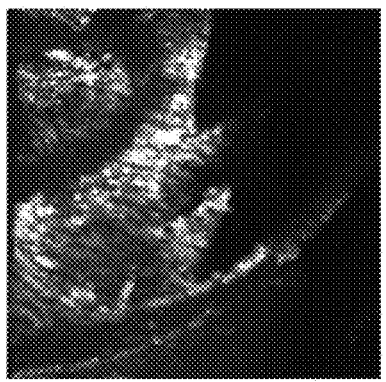
Figure 5A:
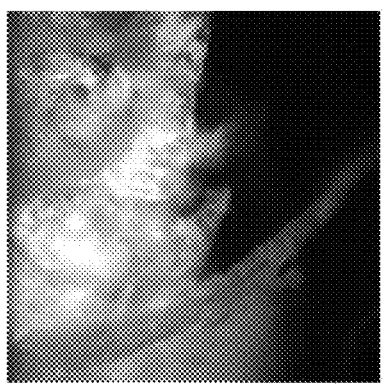

FIGS. 5A-5C show results of imaging a business card at depth. In particular, FIG. 5A is a wide-field image of the business card with no sectioning. FIG. 5B is an image of the business card produced using three-phase SIM reconstruction. FIG. 5C is an image of the business card showing single image demodulation performed according to embodiment methods.

Figure 6C:
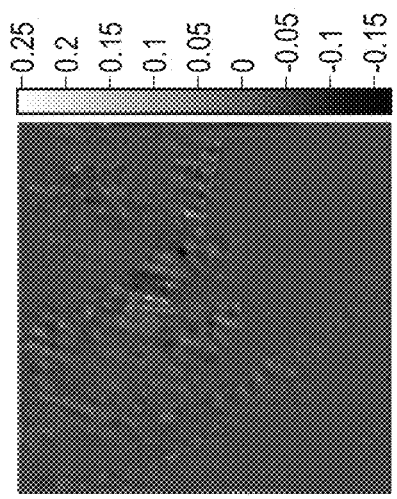
FIGS. 6A-6C are DC images of the business card of FIGS. 5A-5C, representing the out-of-focus portions of the card.
Figure 6B:
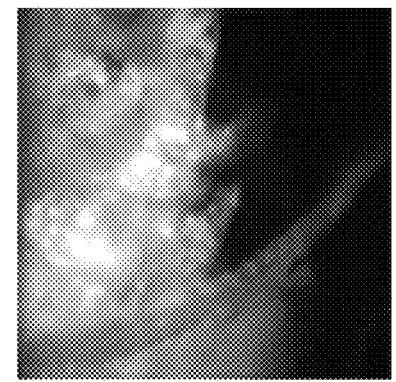
Figure 6A:
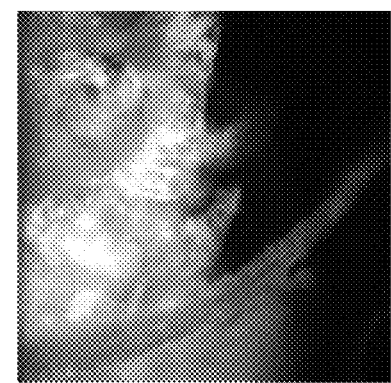

FIGS. 6A-6C are DC images of the business card described in connection with FIGS. 5A-5C, representing the out-of-focus portions of the card. FIG. 6A is the actual DC image taken without the modulation pattern present. FIG. 6B is the estimated DC image, as estimated by filtering as described hereinabove. In both FIGS. 6A and 6B, the scaling is from 0 to 1. FIG. 6C is an image created by calculating the difference between the two images 6A and 6B. The shading bar at the right of FIG. 6C represents the normalized difference between the two images in FIGS. 6A and 6B.

The business card used for the images shown in FIGS. 5A-5C and 6A-6C contained multiple layers. In order to compare to three-phase SIM, three total images were taken with structured illumination light phases of 0°, 120°, and 240°. Each image encompassed a 402×538 µm region, with a square wave modulation pattern of approximately 40 cycles per image in spatial frequency projected at an arbitrary angle of projection of 30°. The images were then processed using equation (1) to produce the demodulated AC signal. Then, only a single-phase image was processed, using embodiment methods involving the Hilbert transform, as described hereinabove.

The angle of the projection pattern is the relationship of the modulation pattern in the X-Y plane. As will be understood in view of this specification, the modulation pattern may be oriented such that it can be filtered correctly in the Fourier space. In some embodiments, modulation patterns may be generated to isolate the background from the foreground with further intelligence.

From the comparison of wide-field image in FIG. 5A, three-image sectioning in FIG. 5B, and single-image embodiment sectioning in FIG. 5C, it is clear that both methods remove a great deal of light from the out-of-focus regions isolating a single plane of interest. Additionally, contrast is greatly improved in the remaining regions. There are some small artifacts in the single-image sectioning illustrated in FIG. 5C. Specifically, some banding remains from an imperfect estimation of the DC image. Additionally, there are some edge effects from the application of the Hilbert function. However, on the whole, the results produced from single image demodulation are high quality as a sectioned image, providing good isolation of a single plane, quite comparable to the three-phase reconstruction illustrated in FIG. 5B.

Further, as will be noted from FIGS. 6A-6C, which quantify the difference between the actual and estimated DC images, the vast majority of pixels are within a few percent ($\sigma=0.01$). Furthermore, as illustrated through the differences between the actual DC image shown in FIG. 6A and the estimated DC image shown in FIG. 6B, the vast majority of pixels in the images remains within a few percent ($\sigma=0.01$).

Image Results from Multiple Depths

Moreover, embodiments are not limited to providing high-quality one-dimensional optical sectioned images. Embodiments may also be used to produce high-quality, three-dimensional sectioned images with high resolution and single-image sectioning, for example, for each layer.

Figure 7A:
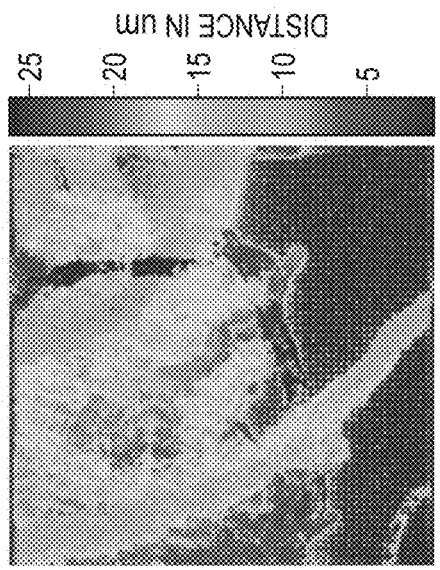
FIGS. 7A-7B are height color maps of the business card used for FIGS. 5A-5C and FIGS. 6A-6C, with three-phase SIM results in FIG. 7A and single-image sectioning according to an embodiment method illustrated in FIG. 7B.
Figure 7B:
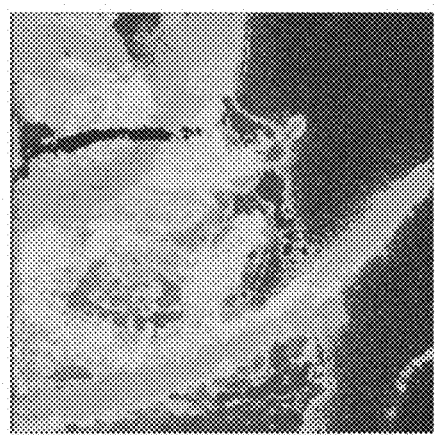

FIGS. 7A-7B are height color maps of the business card used for FIGS. 5A-5C and FIGS. 6A-6C. In particular, FIG. 7A shows three-phase SIM results for imaging the business card from 0 µm to 25 µm, for a total depth range of 25 µm, with 1 µm increments.

FIG. 7B is a color map illustrating results for a similar measurement, except using single-image sectioning according to embodiment methods.

By building a Z stack from 25 individually processed images performed according to embodiment methods, as illustrated in FIG. 7B, a full map was built for the business card across the 25 µm depth range, with the 1 µm increments. These data, as examples, verify the axial resolution and isolation of planes through the construction of a high depth of field (DOF) image. In order to show the extended DOF, a maximum intensity projection (MIP), which combines the pixels with the highest amplitude from each depth into a single image, was used. This type of projection removes all scattered light and shows the entire specimen in-focus along the Z axis. This assists in visualizing the two-dimensional structure without any occlusion from layers above or below (in front of or behind) the focal plane.

The focal plane is the XY plane in the coordinate system illustrated in FIG. 2, while layers or planes in front of or behind the focal plane in FIG. 2 would be parallel to the XY plane, such as the various sections 120 illustrated in FIG. 1C.

For the case illustrated in FIGS. 7A-7B, three-phase SIM, shown in FIG. 7A, was used as a ground truth and quantitatively compared to the single image method illustrated in FIG. 7B. It would be expected, for this case of imaging a business card, to see individual fibers existing within discrete planes, and it would also be expected to observe continuity along each of the fibers. As illustrated in FIGS. 7A-7B, it is clear that the fibers are well isolated from each other, in the FIG. 7B single-image results, on par with the SIM results shown in FIG. 7A.

Figure 8A:
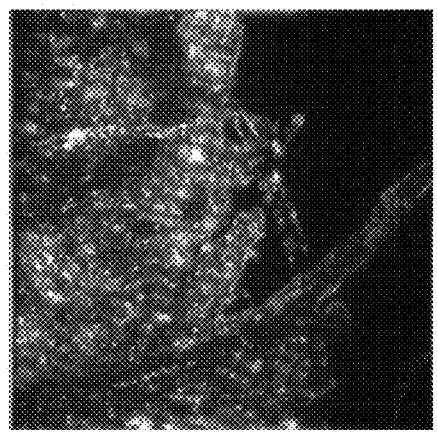
FIGS. 8A-8B are maximum intensity projections of the business card of FIGS. 5A-5B, with FIG. 8A showing the results for existing three-phase SIM and FIG. 8 showing the results for single-image SIM, according to an embodiment method.
Figure 8B:
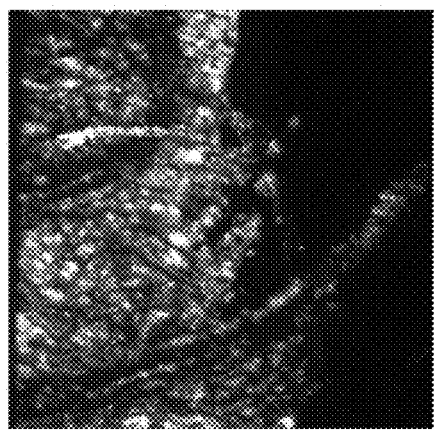

FIGS. 8A-8B show maximum intensity projection of the business card from 0 µm to 25 µm, at 1 µm increments. Intensity for each of the images in FIGS. 8A-8B is normalized and mapped from 0 to 1. FIG. 8A shows the results for three-phase SIM, while FIG. 8B shows the results for single image SIM, according to embodiment methods. These results in FIGS. 8A-8B show that actual observed structure of the fibers and illustrates that the fibers are well isolated from one another, the single image case in FIG. 8B being on par with the typical SIM method of FIG. 8A. In FIG. 8B, it is seen that even the smaller fibers are retained in the image, providing good resolution and reconstruction of the card.

Sectioning Versus Depth

Additionally, embodiments are capable of working at depth to produce sectioned images, even when the plane of interest is occluded by scattering layers in front of or behind the focal plane of interest, such as the focal plane 244b in FIG. 2. This capability of embodiments has been further demonstrated using a phantom, as described hereinafter. In order to model skin imaging, a phantom was built, similar to that demonstrated by Glazowski, Christopher E. James Zavislan, *A coherent model for turbid imaging with confocal microscopy*, Biomedical optics express, 4(4):500-513, 2013, for testing sectioning in highly scattering media. This phantom consisted of a 1951 Air Force resolution target at depth of 30 µm below a piece of highly scattering ground glass. The space between the target and the ground glass was impregnated with a gel of refractive index n=1.33 in order to simulate water. The objective lens was increased to a magnification of 20×, with a numerical aperture NA=0.4. In other respects, the embodiment system used for this verification was the same as the optical set up previously described in relation to FIG. 2.

Figure 9A:
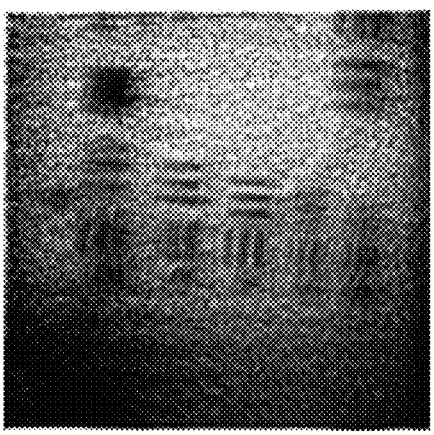
FIGS. 9A-9F are various images of an Air Force resolution targets at 30 µm below a skin phantom and comparing results of existing optical sectioning methods with results of embodiment optical sectioning methods.
Figure 9B:
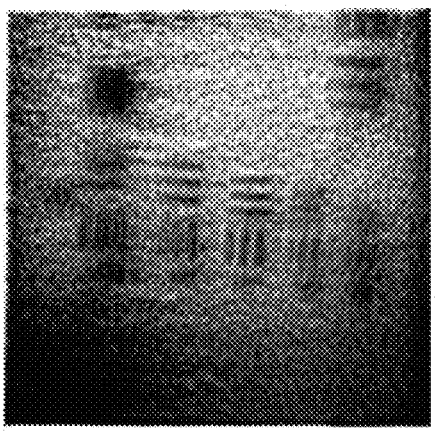
Figure 9C:
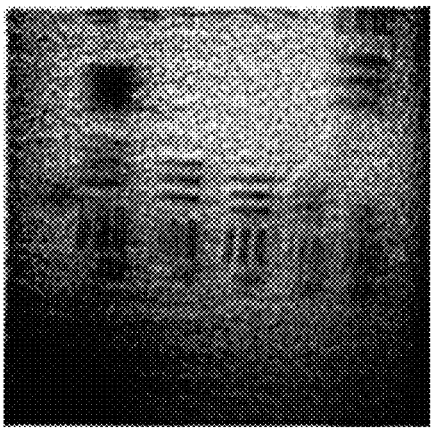

FIGS. 9A-9F are various images of the Air Force resolution target at 30 µm below the skin phantom described above. The portion of the 1951 Air Force resolution targets that was imaged included group 6, elements 2-6, which encompasses resolutions of about 7.0 µm to about 4.4 µm. FIGS. 9A-9C show the single-phase reconstruction results for each of the three phases, 0° (FIG. 9A), 120° (FIG. 9B), and 240° (FIG. 9C). These results demonstrate the effectiveness of embodiment devices and methods and systems regardless of modulation phase.

Figure 9D:
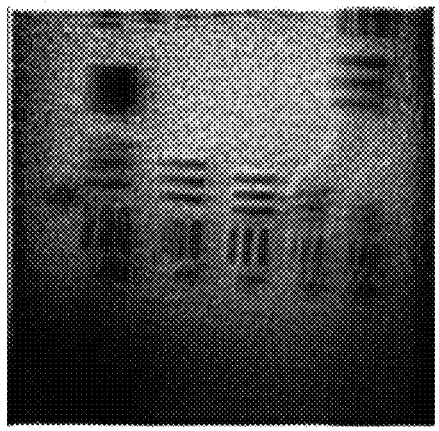
Figure 9E:
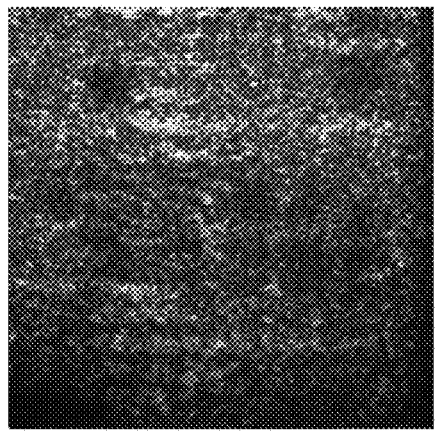
Figure 9F:
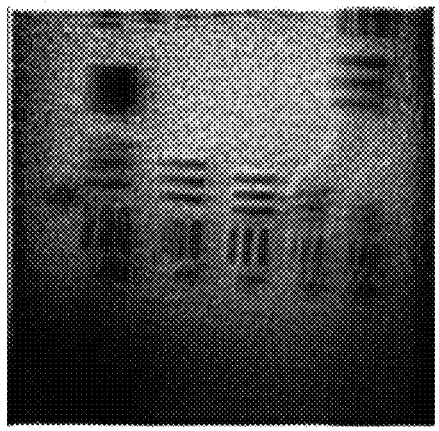

FIG. 9D shows the wide-field image with strong cluttering from out-of-focus regions. FIG. 9E shows the three-phase sectioning (traditional SIM) results exhibiting major distortions due to local phase shifts from turbid media from the turbid scattering medium. FIG. 9F is an average of all of the three single-phase images illustrated in FIGS. 9A-9C, providing additional noise reduction. Accordingly, as illustrated in FIG. 9F, embodiments are not limited to providing sectioned images based on a single raw image, but may alternatively be based on multiple raw images, each one producing a separate sectioned image. However, these results, as illustrated in FIG. 9F, differ from traditional three-phase SIM techniques, in that full optical sectioning is provided for each image when using embodiment systems and methods.

As illustrated in FIGS. 9A-9F, the resolution chart was imaged using both three-phase and single-phase SIM. In the wide-field image of FIG. 9D, the structure from the resolution chart below the turbid medium is visible, yet the contrast is low due to the scattered light from the turbid medium (ground glass) above the target. It should be particularly noted that the three-phase SIM result illustrated in FIG. 9E shows poor sectioning. This is likely due to small changes in the phases of the modulation patterns as they pass through multiple surfaces before reaching the focal plane. Because three images are used for FIG. 9E according to the traditional SIM method, sectioning is highly dependent on how well each of the three phases overlap at the focal plane. Any changes in phase are liable to produce artifacts at the intended target. This problem can be slightly mitigated by using additional phases or multiple random patterns, but a significant disadvantage of any such attempted mitigation is the need for additional samples (images). For this experiment illustrated in FIGS. 9A-9F, the phase changes are likely due to differences in optical path from the rough surface of the ground glass above the target. For this experiment, the phase changes contributing to the problems shown in FIG. 9E with the traditional SIM technique are likely due to differences in optical path length from the rough surface of the ground glass above the target resolution target. However, with in vivo imaging, phase misalignment may similarly occur, and also may be exacerbated by a host of factors such as vibration, diffusion, and small changes in refractive index. This illustrates further the advantages of embodiment methods and systems, which can overcome issues of phase misalignment in turbid media, as well as issues related to in vivo imaging, such as vibration, diffusion, and refractive index changes, as noted. Accordingly, many issues with traditional SIM techniques and any other techniques that include the use of multiple images in order to produce one sectioned image can be overcome using embodiment single-phase sectioning systems and methods.

As illustrated in FIGS. 9A-9F, the single-phase sectioning provides much better resolution, as it is much less sensitive to phase. Because the spiral function used for the Hilbert transform, for example, does not require a priori knowledge, small deviations in the frequency or angle of the pattern do not negatively impact the sectioning. This results in a much more robust method of sectioning at depth, such as within turbid media or behind turbid media. FIGS. 9A-9C show good contrast at the target, isolating a single plane from the scattered light.

As noted above, FIGS. 9A-9C show the single image, embodiment results for individual phases 0°, 120°, and 240°, respectively. By taking the mean of all three phases after they have been processed, as illustrated in FIG. 9F, it is noted that there is a further improvement in noise reduction and contrast.

Figure 10A:
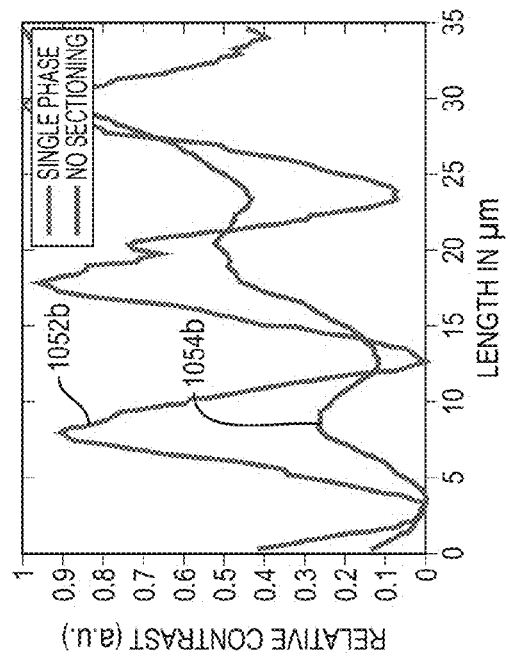
FIGS. 10A-10B are graphs showing improvement in contrast between the example single-image results of FIG. 9A, for optical sectioning according to an embodiment method, and the conventional microscope image of FIG. 9D, without optical sectioning.
Figure 10B:
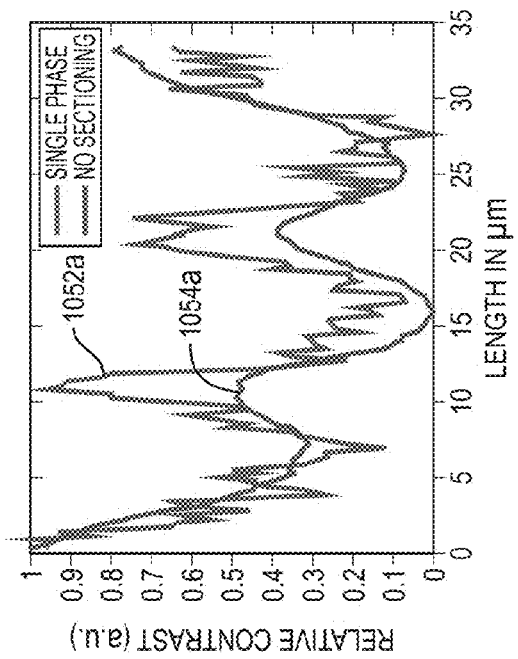

FIGS. 10A-10B show the improvement in contrast between the example single image result of FIG. 9A for optical sectioning according to embodiments and the conventional microscope image of FIG. 9D, without optical sectioning. In particular, contrast was determined by taking a cross-section of the images of FIGS. 9A and 9D along Group 6, Element 4 of the Air Force resolution target, as illustrated and marked with a rectangular box in FIG. 9D. Group 6, Element 4 of the target has a line width of 5.52 µm. In particular, FIG. 10A shows the results for horizontal cross-sections (vertical bars for Group 6, Element 4). The results for the single-phase imaging of FIG. 9A are illustrated with a curve 1052$a$ in FIG. 10A, while the result with no optical sectioning, corresponding to FIG. 9D, is shown with a curve 1054$a$ in FIG. 10A.

Similarly, in FIG. 10B, contrast curves are shown for horizontal bars (a vertical cross section of FIGS. 9A and 9D) of the Group 6, Element 4 of the target. Contrast for the single-phase result of FIG. 9A is shown with a curve 1052$b$, while results for the unsectioned image of FIG. 9D are shown with a curve 1054$d$.

The results shown in FIGS. 10A-10B illustrate the contrast improvements and removal of DC signal that can be achieved, as an example, using the single-phase sectioning illustrated in FIG. 9A. There is a clear difference in the contrast of the signal as the scattered light from in front of the target has been removed in FIG. 9A. It should be noted that there is a small trend across the resolution chart in contrast. This small trend is due to slight nonuniformities in the lighting of the sample used and is not related to the Air Force target itself. By calculating the relative contrast (maximum-minimum) for each cycle, it is shown that there is a 2× improvement in the vertical direction, as illustrated in FIG. 10A, and a 5× improvement in the horizontal direction, as illustrated in FIG. 10B. The three-phase sectioning results have been left out of FIGS. 10A-10B, as the bars of the target are no longer resolvable at this depth, as illustrated in FIG. 9E.

Three-Phase SIM at Depth

Figure 11A:
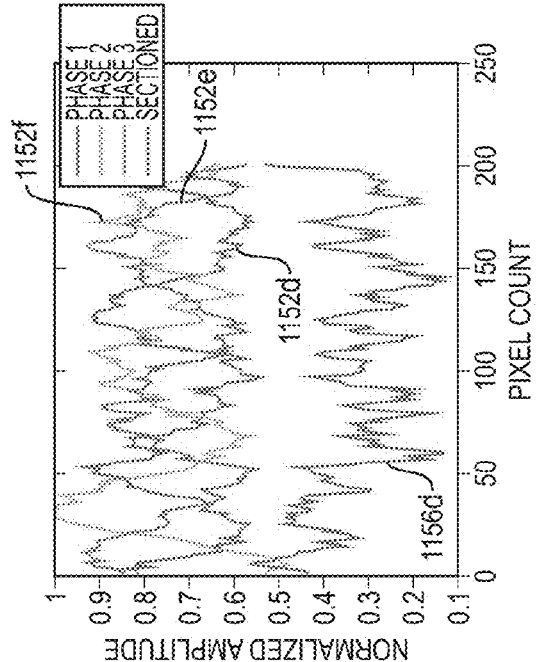
FIGS. 11A-11B are graphs further illustrating disadvantages of three-phase sectioned imaging within turbid media, particularly the existing three-phase SIM method applied to the target of FIGS. 9A-9F.
Figure 11B:
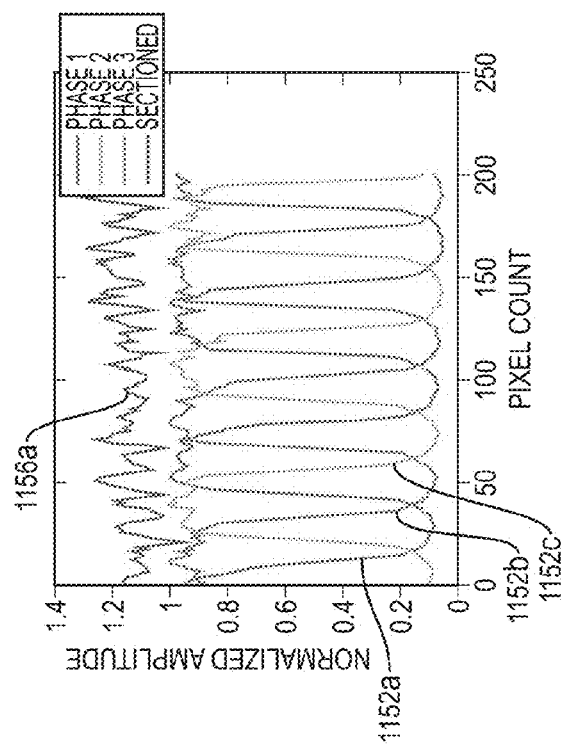

FIGS. 11A-11B further illustrate the disadvantages of three-phase sectioned imaging within turbid media, namely disadvantages that are apparent in FIG. 9E, compared with single-phase images according to embodiments, as illustrated in FIGS. 9A-9C. In particular, FIGS. 11A-11B are graphs showing three-phase SIM measurement results for a modulation pattern projected onto a mirror, with the imaging plane at the surface of the mirror (D=0 µm) (FIG. 11A) and with the mirror placed within the skin phantom described hereinabove (D=10 µm) (FIG. 11B).

FIG. 11A particularly shows three different single-phase, normalized amplitudes 1152$a$-1152$c$ for three different corresponding phases. FIG. 11A also shows a sectioned image normalized amplitude 1156$a$ for a sectioned image produced using the three phases 1152$a$-$c$ for the square pattern projected onto a mirror surface, with no turbid medium (D=0 µm) in front.

FIG. 11B shows the results for D=10 µm within the skin phantom for three different phases, illustrated at curves 1152$d$-$f$, respectively. FIG. 11B also shows the normalized amplitude for a sectioned image created from the images corresponding to 1152$d$-$f$ in combination. Viewing the cross sections, it can be seen how the relative phase and frequency begin to diverge. Phase shifts of 0, 120, 240 degrees were used, in this case known from a pattern uploaded to the DMD. However, after the pattern has passed through the medium and back to the camera, those phases are no longer present, as they deviate in such a way that the initial assumption about phase needed for traditional SIM no longer holds true.

The amplitude from the surface measurements in FIG. 11A extends from 0.1 to 1 times the total dynamic range of the camera. In comparison, at depth, as illustrated in FIG. 11B, the signal contrast is cut in half for the individual phase measurements. As a result of the decreased signal contrast for the individual phases in a traditional SIM measurement, the sectioning contrast is greatly degraded at depth, achieving a maximum amplitude of 0.5, as illustrated in FIG. 11B at the sectioned image curve 1156b. Additionally, the phases of each signal 1152d-f are shifted slightly at depth under the turbid skin phantom medium, creating a low frequency modulation in the curves 1152d-f, which does not actually exist on the mirror.

Furthermore, other additional measurements at depths greater than the 10 µm measurements illustrated in FIG. 11B demonstrate that these errors are greatly exacerbated at greater depths, rendering the final three-phase sectioned image nearly useless. The alignment of these patterns is critical for the success of traditional three-phase SIM. This further illustrates the advantages of embodiment methods, in which a single-phase sectioned image is robust with respect to small changes in frequency and phase. Accordingly, embodiments described herein produce high quality sectioning at depth in turbid media.

Sectioning Biological Samples

FIGS. 12A-12D, 13A-13D, 14A-14D, and 15 illustrate results of imaging according to embodiments as applied to biological samples. In particular, FIGS. 12A-12D and 13A-13D illustrate results for imaging onion cells, while FIGS. 14A-14D and FIG. 15 illustrate results of imaging human skin cells. These results further illustrate advantages of embodiment methods as applied to biological samples, including the in vivo human arm skin examples of FIGS. 14A-14D and FIG. 15. For these examples, a square modulation pattern of 40 cycles per image was projected horizontally to modulate the image. For horizontal projection, the projected angle of the modulation pattern is zero degrees with respect to the X-Y plane.

Figure 12A:
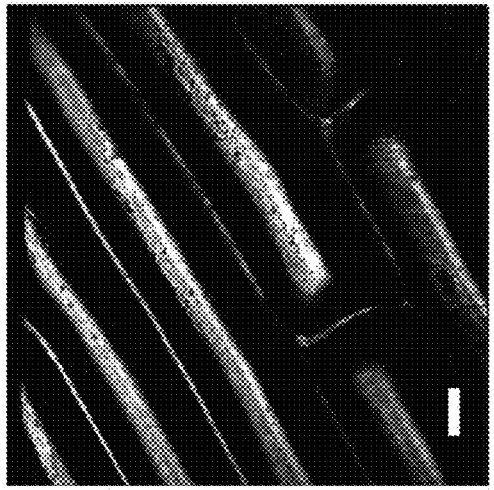
FIGS. 12A-12D are imaging results for a top layer of two layers of onion cells placed directly on top of one another, with the images comparing un-sectioned imaging results, traditional three-phase SIM sectioning results, and embodiment single-image sectioning results.
Figure 12B:
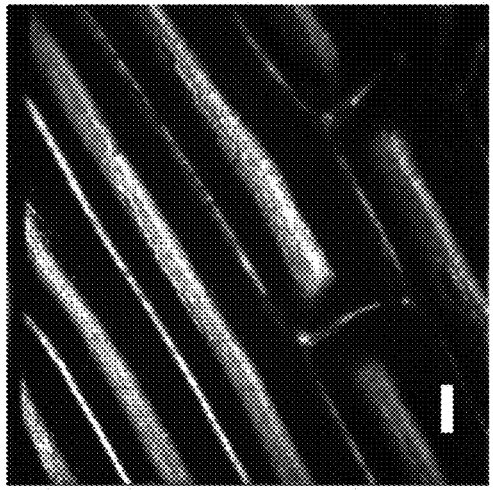
Figure 12C:
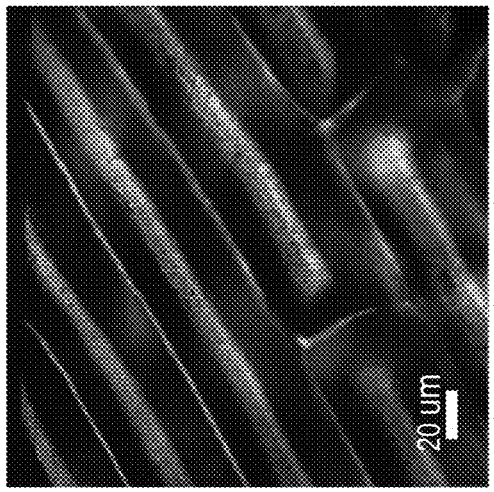
Figure 12D:
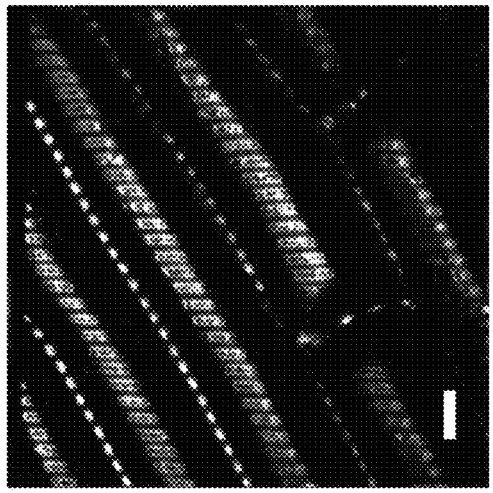
Figure 13B:
FIGS. 13A-13D are images showing results for imaging the layer of onion cells of FIGS. 12A-12D about 5 μm below the top layer illustrated in FIGS. 12A-12D.
Figure 13D:
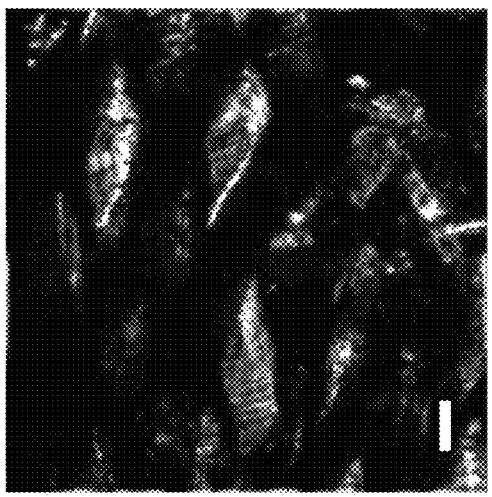
Figure 13A:
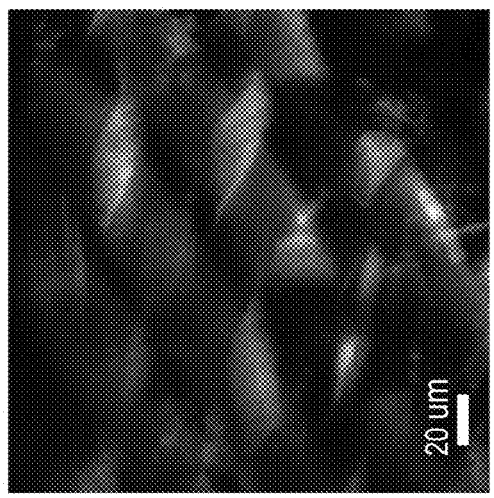
Figure 13C:
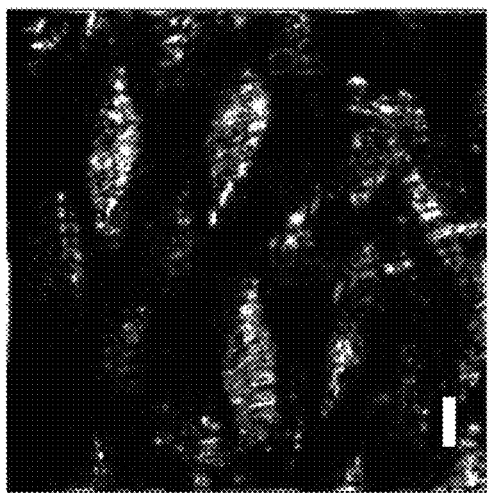

For the results of FIGS. 12A-12D and 13A-13D, including images of onion layers, two layers of onion cells were placed directly on top of one another. The system was focused at the top layer of cells, as illustrated in FIGS. 12A-12D. FIG. 12A is a wide field image of multiple onion cells aligned diagonally across the image of the top layer. Scattered light from the cells below the surface can be seen in the image of FIG. 12A. FIG. 12C is an image showing single image sectioning that was performed to remove the scattered light from below, which is visible in FIG. 12A. However, there are strong banding artifacts due to an imperfect demodulation. This imperfect demodulation comes as a result of data loss, where the patterned light goes to 0. This banding is exacerbated by choosing a low frequency modulation pattern. Accordingly, it should be understood that a higher frequency pattern can be used to produce more uniform imaging. However, with a higher frequency pattern of higher spatial frequency, the sectioning depth is effectively reduced. In clinical applications, it is possible to adjust the frequency of the spatial modulation of the modulated light relative to the imaging depth. Adding in the other two phases ameliorates this issue by filling gaps of data loss. By processing the other two phases and adding them together, with the results illustrated in FIG. 12D, it is seen that the results are nearly identical to three-phase SIM sectioning results, illustrated in FIG. 12B. In comparison to traditional three-phase SIM, illustrated in FIG. 12B, the results of FIG. 12D illustrate that similar sectioning and resolution can be achieved through embodiment methods and systems.

The scale bar is 20 µm wide at the bottom left of each of FIGS. 12A-12D. FIG. 12A illustrates wide field imaging from adding all three phases. FIG. 12B illustrates traditional three-phase SIM sectioning. FIG. 12C illustrates single-phase sectioning using Hilbert demodulation. FIG. 12B illustrates the three images, sectioned using Hilbert demodulation, and then added together. Similar considerations apply to FIGS. 13A-13D, respectively FIGS. 13A-13D illustrate a particularly strong advantage of embodiment methods, in that robustness of optical sectioning within a turbid medium is significantly improved relative to traditional SIM. FIGS. 13A-13D show results for imaging the layer of onion cells about 5 µm below the cells illustrated in FIGS. 12A-12D. The scattered light from the cells above can be seen clearly in the wide field image of FIG. 13A. The single-image sectioning result, illustrated in FIG. 13C, produces high quality sectioning with only minimal artifacts. When all three phases for single image sectioning according to embodiment methods are added together (results illustrated in FIG. 13D), the advantages over traditional SIM results (illustrated in FIG. 13B) are clearly apparent. First, many artifacts in traditional SIM, illustrated in FIG. 13B, can be seen around the edges, reducing total contrast within the image. Furthermore, in FIG. 13B, there is some residual modulation pattern within the image showing the traditional SIM results.

Figure 14B:
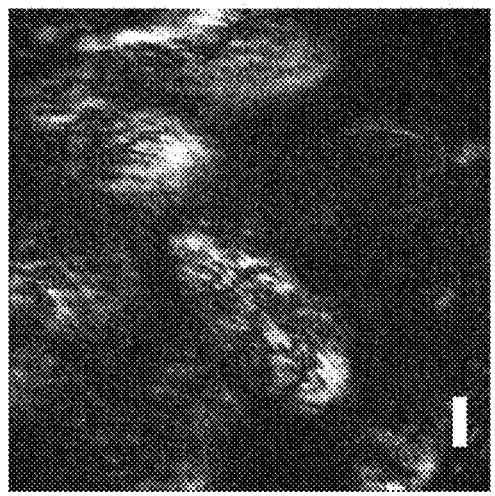
FIGS. 14A-14D are images of human skin cells in vivo, comparing a wide-field image of the skin, images acquired based on traditional three-phase imaging, and results of imaging according to an embodiment single-phase optical sectioning method.
Figure 14D:
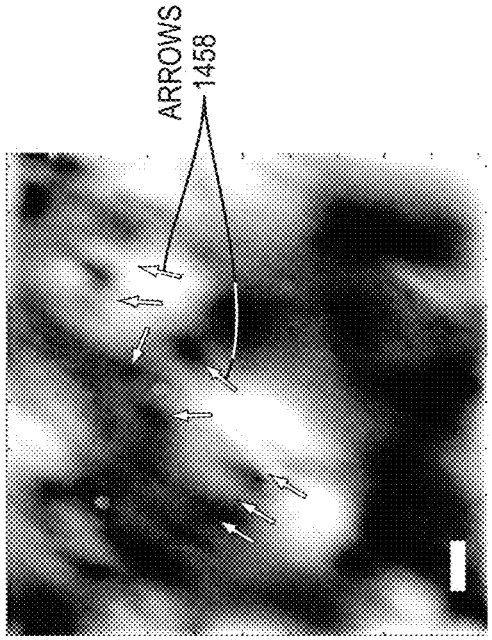
Figure 14A:
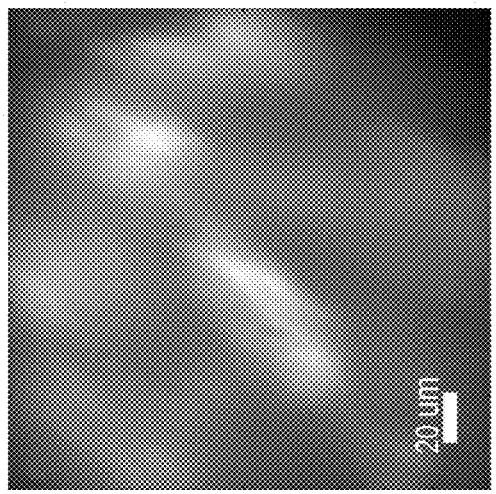

FIGS. 14A-14D illustrate results of embodiment imaging applied in vivo to human skin. In FIG. 14A, which is a wide-field image of the skin, very little detail is visible, since there is a great deal of scattering from other layers. Given the frame rate and magnification of the camera (20 Hz), there is motion from frame to frame. The motion comes as a result of many factors, including, for example, muscle twitches under the skin, larger movements of the body due to breathing, and pulses as the heart beats. As a result of all of this motion, the traditional three-phase imaging, illustrated in FIG. 14B, is completely distorted. The differencing scheme on which traditional SIM imaging relies involves only the modulation changing phase, but does not include accounting for motion within the specimen itself. With the specimen changing location over the three frames included for the different phases that are combined for the SIM image of FIG. 14B, the result does not contain useful information. In FIG. 14B, only highly reflective portions of the image are visible in the final processed image. However, there is no indication of structure, such as nuclei, that would be present themselves as dark circles within the tissue.

Figure 14C:
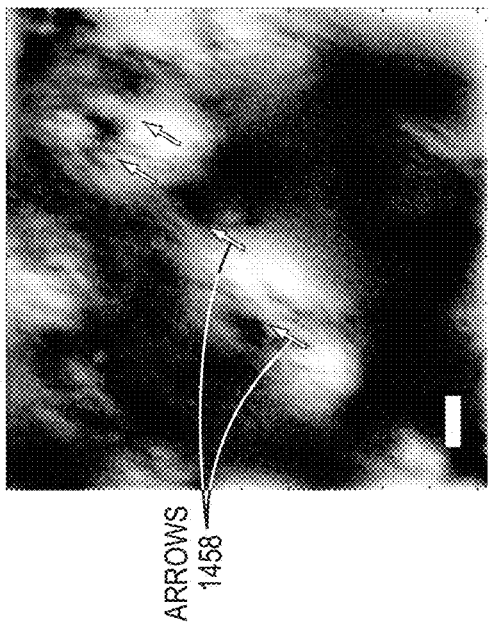

FIG. 14C shows the result of single image processing, according to embodiment methods relying on the Hilbert transform. FIG. 14C illustrates good sectioning and contrast of the cells below the surface of the skin. In FIG. 14C, the granular layer of the skin is visible, where the dark spots, pointed to by arrows 1458, indicate the nuclei of the cells. The depth, dimensions, and relative sizes are consistent with those shown by Rajadhyaksha (Rajadhyaksha, Milind, et al., "In vivo confocal scanning laser microscopy of human skin: melanin provides strong contrast," *Journal of Investigative Dermatology*, 104(6):946-952, 1995).

The image of FIG. 14B was created when the three, single-image sectioned images with three different phases were added together, according to an embodiment method. In this case, the signal-to-noise ratio of the image is increased. The result in FIG. 14D is not necessarily better, as motion artifacts distort the image slightly, but it can be seen that a number of additional cells are revealed in the image, relative to the single-frame embodiment image in FIG. 14C. However, it should be noted that, across three frames, using the embodiment method that is additive rather than the differencing of traditional SIM, does a better job of revealing the nuclei.

FIG. 15 is an RGB map of the three images used in FIG. 14D, presented to show the motion from frame to frame. At the bottom left edges of the structures within the image of FIG. 15, the color is predominantly red. The red represents the first frame in the stack of FIG. 14D and illustrates that only some of the cells are in this location for a moment. By the third frame, illustrated in blue, the cells have shifted towards the upper right corner of the image of FIG. 15. It is apparent that, within the three frames, the subject human skin cells moved a few microns diagonally, resulting in an imperfect reconstruction of the multi-frame sectioning techniques. Accordingly, FIG. 15 further illustrates the advantages of embodiments that perform single-image sectioning.

Additional Results

FIGS. 16A-16C, 17A-17B, and 18A-18B show results of imaging a human hair using embodiment methods and systems. For these results, the same system as described hereinabove was used. Results of three-phase SIM, using images taken with phases 0°, 120°, and 240°, were also obtained for comparison. Each image encompassed a 402× 538 µm region, with a modulation pattern of frequency about 40 cycles per image, projected at 30°. The images for the SIM measurements were processed using the differencing equation for $I_{AC}$, as described hereinabove in order to produce the demodulated AC signal. Following this, one of the single-phase images at a time was processed using embodiment methods and systems for comparison.

FIGS. 16A-16C show images of the sectioned hair. FIG. 16A is a wide-field image without sectioning, FIG. 16B is an image produced using traditional SIM, three-image sectioning, and FIG. 16C is an image produced by single-image sectioning, according to embodiment methods. Scattered light from behind the hair is excluded from the image, providing good contrast. Additionally, out-of-focus planes from the top of the hair have been removed, providing good axial resolution.

FIGS. 17A-17B show a three-dimensional image, created from a Z stack with multiple focal depths for the hair to create a three-dimensional reconstruction of the hair object target. FIGS. 17A-17B used 20 images, taken from the top of the hair and down, in 1 µm steps. From these data, a color-coded height map was generated, showing the sectioning resolution of the image. It can be seen that the mapping for the single-image sectioning illustrated in FIG. 17B is comparable to the three-phase imaging results illustrated in FIG. 17A. It should be understood that, for FIG. 17A, three phases were used to produce the image for each depth, while in FIG. 17B, a single image was used for each depth, according to embodiment methods, to produce each of the 26 sectioned images acquired from 0 µm to 25 µm at 1 µm increments. With each of the planes isolated, an extended depth of field image can be produced. The color bar at the right of FIG. 17B shows depth, in microns.

Furthermore, with each of the sectioning planes isolated, an extended depth of field image can be produced. This shows each of the planes within the same image, without the scattered light which normally reduces the total resolution. This type of image is known as a maximum intensity projection, and is illustrated in FIGS. 18A-18B. FIG. 18A illustrates the maximum intensity projection for the three-phase SIM traditional technique applied to the human hair as illustrated in FIG. 17A. In contrast, FIG. 18B is the maximum intensity projection image corresponding to the single image height map illustrated in FIG. 17B. The results shown in FIGS. 18A-18B are, again, similar to those of FIGS. 17A-17B, demonstrating that the single image embodiment methods are capable of producing high quality sectioned images at one third the time that would be required for conventional SIM.

Figure 19B:
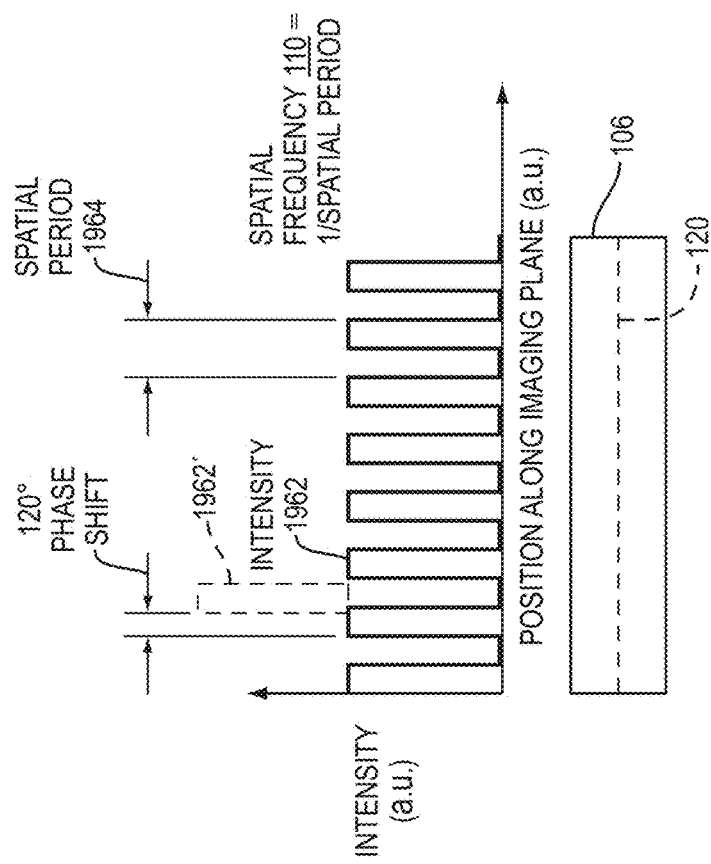
FIG. 19B is a diagram showing the target scene of FIG. 19A, along with a graph showing example intensity as a function of position along the imaging plane, for structured illumination applied to the target.
Figure 19A:
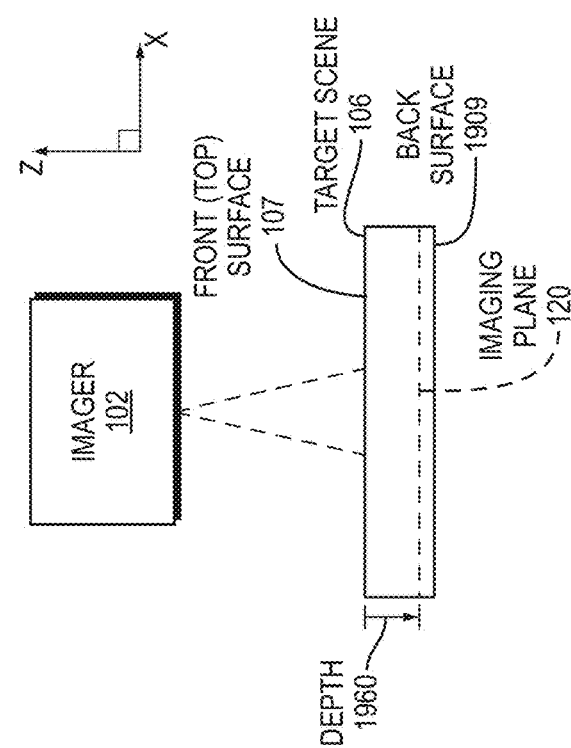
FIG. 19A is a schematic diagram illustrating the imager 102 and target scene 106 of FIGS. 1B-1C in order to illustrate depth in a target scene, as used in the present disclosure.

FIG. 19A is a schematic diagram illustrating the imager 102 and target scene 106. As illustrated in FIG. 19A, the imaging plane 120 that was illustrated in FIG. 1C may be located at any depth 1960 in the target scene 106. The front surface 107, which may also be referred to as a top surface herein, since in many cases, targets are oriented with the surface to be imaged oriented vertically. In any case, the Z direction should be understood to be the imaging direction with respect to the front or top surface 107. The imaging plane 120 may be located at any depth below the front or top surface 107. As illustrated in FIG. 2, the Z direction is perpendicular to the front surface of the target 106. The splitting mirror 240 illustrated in FIG. 2 results in a folding of the Z plane between the target 106 and the camera 248, such that the XY imaging plane of the camera is perpendicular to the XY plane of the surface of the target 106.

FIG. 19B illustrates the target scene 106 and example imaging plane 120 at depth in the target scene. FIG. 19B also shows, in graph form, an example intensity profile 1962 of structured illumination focused at the imaging plane 120. Intensity (in arbitrary units) is shown on the vertical axis as a function of position along the imaging plane (in arbitrary units) along the horizontal axis. The intensity 1962 of the structured illumination has an example spatial period 1964. The spatial frequency 110 of the structured illumination may then be determined according to frequency 110=1/spatial period 1964.

In FIG. 19B, the example intensity profile 1962 is depicted as a spatially varying square wave. However, in other embodiments, the intensity 1962 may be applied at the imaging plane 120 with sinusoidal or other intensity variation, for example. In certain embodiments, the spatial frequency of the structured illumination may be variable, depending on conditions such as field of view (width or area of the imaging plane 120), depth of the imaging plane 120 in the target scene 106, a degree of turbid medium within the target scene 106, etc. in order to produce the best imaging resolution. An example intensity 1962' is also illustrated with a 120° phase shift with respect to the intensity 1962.

Furthermore, there is nothing limiting embodiments to using only a single spatial frequency or orientation for structured illumination. Within a single image, multiple frequencies and projection angles may be employed. These can be used to further discriminate the in-focus and out-of-focus sections, based on the structure of the specimen. For instance, when imaging collagen, whose fibers are preferentially oriented in a particular direction, it is preferred to illuminate with a projection pattern whose frequency pattern is orthogonal to the fibers. Single or multiple discreet frequencies may be used, with single or multiple orientations, varied duty cycles, etc. The spatial frequency is only fundamentally limited by the resolution of the optical system (Abbe limit or Rayleigh criterion). These criteria are analog limitations determining whether the system will be able to distinguish one line from another. Similarly, once digitized, the system should obey the Nyquist sampling theorem, which states that the system must sample (spatially), at greater than twice the frequency of the projected modulation pattern.

It should be understood that embodiments are applicable to imaging any object, whether the depth is 0, such that an imaging plane is at the surface of the target scene, or whether the imaging plane 120 is at some depth within the target scene from the front surface. Furthermore, it should be understood that embodiments may apply to a wide variety of targets, including those that do not include a flat front (top) surface, as the target scene 106 does. For example, the onion imaging described hereinabove in relation to FIGS. 12A-12D and FIGS. 13A-13D did not include a perfectly flat front surface 107. In another example, the hair follicle imaging described in relation to FIGS. 16A-16C, 17A-17B, and 18A-18B included a three-dimensional object, and the different depths of focus of the three-dimensional hair follicle were particularly illustrated in FIGS. 17A-17B. Accordingly, it should be understood that when imaging within a target scene, such as the target scene 106 illustrated in FIG. 19A, a three-dimensional image may include a series of sectioned images at various depths, such as 0 (at the surface 107) and greater depths. Furthermore, it should be understood that sectioned images may be obtained in front of the top surface 107, at negative depth 1960 (closer to the imager 102), or beyond the back surface 1909 (at depths greater than the thickness of the target scene 106).

Figures 20, 21:
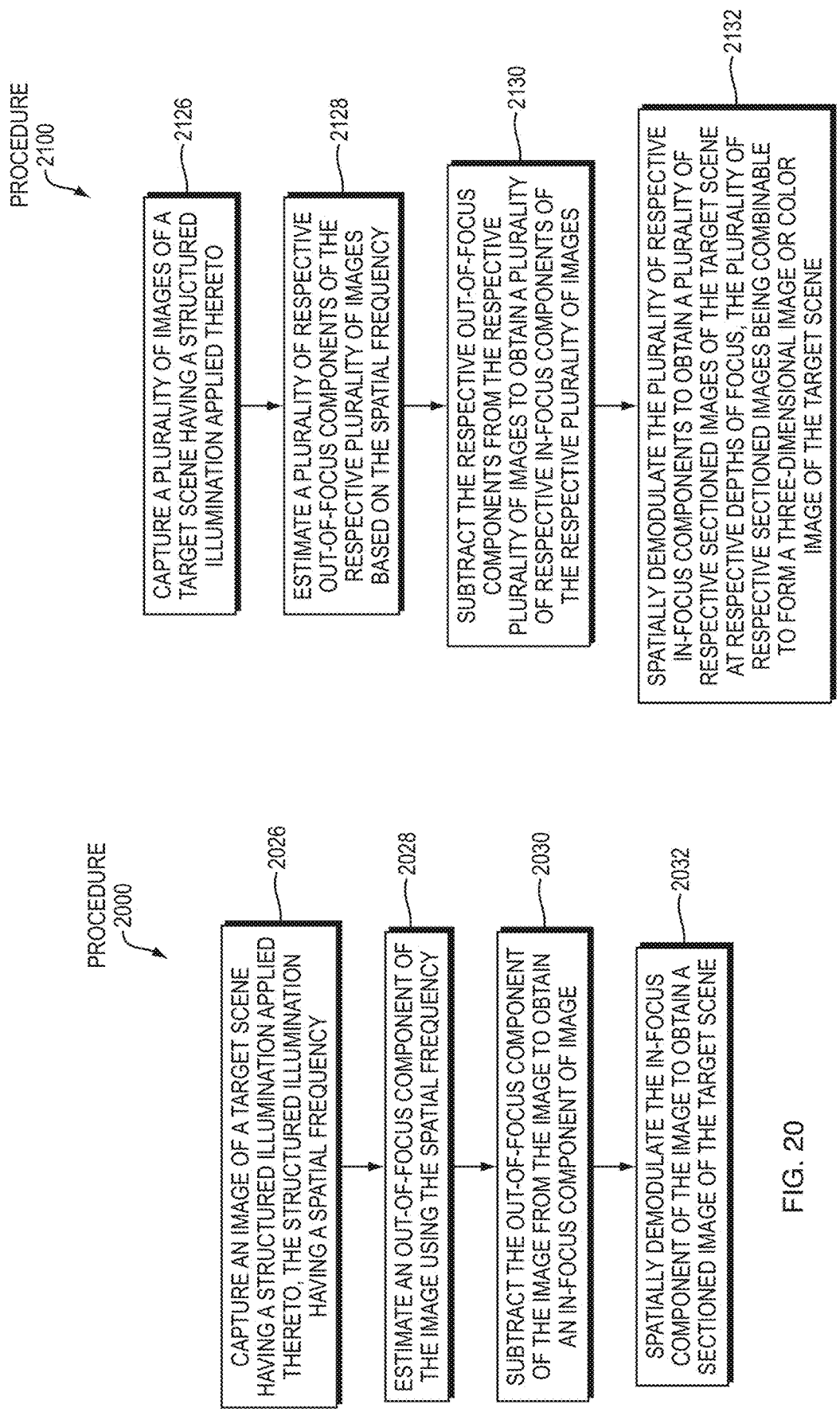
FIG. 20 is a flow diagram illustrating an embodiment method of optical sectioning.
FIG. 21 is a flow diagram illustrating an embodiment method of optical sectioning applicable to create a three-dimensional image or a color image of a target scene.

FIG. 20 is a flow diagram illustrating an embodiment procedure 2000 that may be used to produce a sectioned image. It should be understood that a wide variety of the example embodiment systems disclosed herein may be used to carry out the procedure 2000.

In procedure 2000, at 2026, an image of a target scene is captured, with the target scene having a structured illumination applied thereto, the structured illumination having a spatial frequency. At 2028, an out-of-focus component of the image is estimated. At 2030, the out-of-focus component of the image is subtracted from the image to obtain an in-focus component of the image. At 2032, the in-focus component of the image is spatially demodulated using the spatial frequency of the structured illumination to obtain a sectioned image of the target scene.

FIG. 21 is a flow diagram illustrating a procedure 2100 for optical sectioning. The procedure 2100 includes capturing a plurality of images, and applying the same procedure, or similar procedures, as those illustrated in the procedure 2000 in FIG. 20. The procedure 2100 may be considered either a variation of the procedure 2000, in which the procedure 2000 or steps thereof are repeated for multiple images to produce a 3D image, or as an independent procedure directed to a method of producing a 3D image of a target scene.

At 2126, a plurality of images of the target scene is captured, with the target scene having a structured illumination applied thereto. At 2128, a plurality of respective out-of-focus components of the respective plurality of images is estimated. Further in the procedure 2100, at 2130, the respective out-of-focus components are subtracted from the respective plurality of images to obtain a plurality of respective in-focus component of the respective plurality of images. At 2132, the plurality of respective in-focus components are spatially demodulated to obtain a plurality of respective sectioned images of the target scene at respective depth of focus, the plurality of respective sectioned images being combinable to form a three-dimensional (3D) image or color image of the target scene.

Instead of producing a 3D image, embodiments may, in similar fashion, produce a color image of a single optical section using multiple images, with a separate image acquired for each color of a section. Furthermore, in still other embodiments, a single-image optical section may be produced in color by separating individual components of a Bayer filter, processing each color in series or in parallel, and then recombining the colors. In this type of single-image optical section in color, spatial resolution may be reduced somewhat compared with a monochrome single-image optical section because of diffraction may result in frequencies of a projection pattern shifting with respect to each other.

Figure 22:
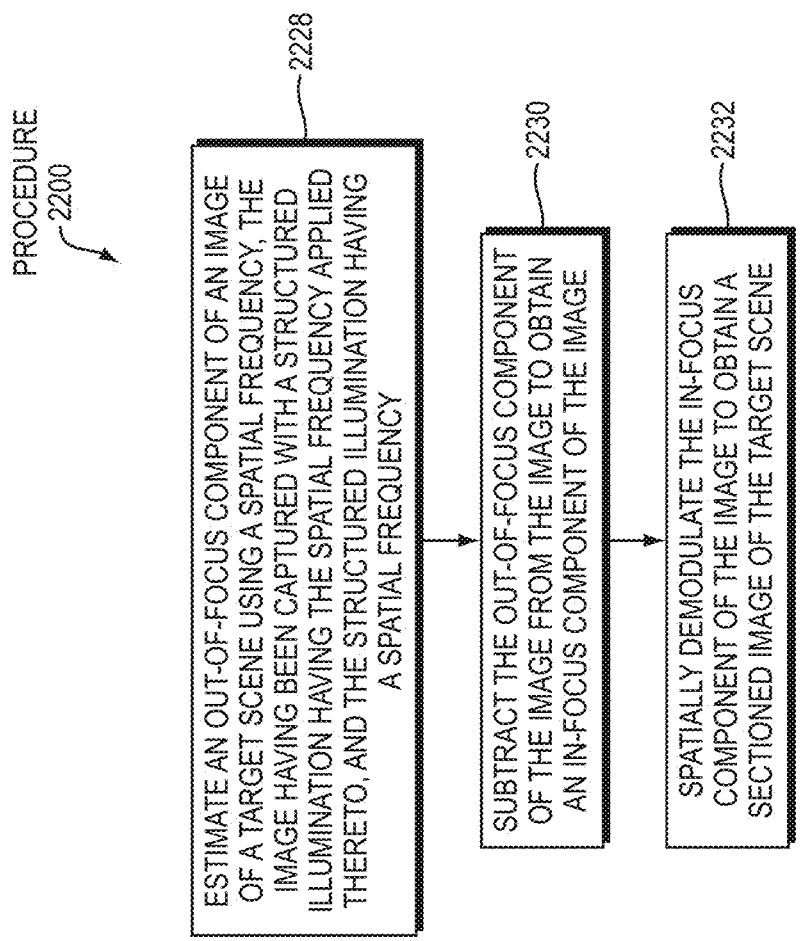
FIG. 22 is a flow diagram illustrating a procedure an embodiment optical sectioning procedure that can be performed in embodiment devices based on an image received.

FIG. 22 is a flow diagram illustrating an embodiment procedure 2200 for optical sectioning. The procedure 2200 is similar to the procedure 2000 illustrated in FIG. 20, except that the procedure 2200 does not include actually capturing an image of the target scene with structured illumination applied, as the image of the target scene so captured may be provided, such that in various embodiments, a processor or other device may be configured to further process the captured image. This can occur, for example, in a web-based server that receives captured images and carries out the procedure 2200 to produce the sectioned image based thereon.

At 2228, an out-of-focus component of an image of the target scene is estimated, the image having been captured with a structured illumination at the source applied thereto, and the structured illumination having a spatial frequency. At 2230, the out-of-focus component of the image is subtracted from the image to obtain an in-focus component of the image. At 2232, the in-focus component of the image is spatially demodulated using the spatial frequency to obtain a sectioned image of the target scene.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method of optical sectioning, the method comprising:
    estimating an out-of-focus component of an image of a target scene using a spatial frequency, the image captured with structured illumination applied to the target scene, and the structured illumination having the spatial frequency;
    subtracting the out-of-focus component of the image from the image to obtain an in-focus component of the image; and
    spatially demodulating the in-focus component of the image to obtain a sectioned image of the target scene.

2. The method of claim 1, wherein the image of the target-scene is captured at a time instance.

3. The method of claim 1, wherein the image of the target scene is captured under an optically turbid medium.

4. The method of claim 3, wherein the optically turbid medium is at least one of animal or human tissue, animal or human skin, cells, fluid, and an integrated circuit.

5. The method of claim 1, wherein the structured illumination is ultraviolet, visible, or infrared in wavelength.

6. The method of claim 1, wherein the structured illumination is partially coherent or incoherent structured illumination.

7. The method of claim 1, wherein estimating the out-of-focus component of the image includes applying a notch filter to the image, the notch filter having a filter frequency substantially equal to the spatial frequency of the structured illumination.

8. The method of claim 1, further including determining the spatial frequency of the structured illumination from the image.

9. The method of claim 1, wherein the image captured with the structured illumination applied is a first image, the method further including capturing a second image of the target scene without the structured illumination applied thereto, and wherein estimating the out-of-focus component of the image further includes using the second image.

10. The method of claim 1, wherein spatially demodulating the in-focus component includes applying a demodulation selected from the group consisting of a Hilbert transform, a spiral Hilbert transform, and a Wiener filter to the in-focus component.

11. The method of claim 1, further including capturing the image of the target scene including capturing light from the target scene using collection optics with a numerical aperture between approximately 0.25 and approximately 0.4.

12. The method of claim 1, further including:
estimating a plurality of respective out-of-focus components of a respective plurality of images of the target scene using a spatial frequency, the plurality of images captured with a structured illumination source applied to the target scene, and the structured illumination source having the spatial frequency;
subtracting the respective out-of-focus components from the respective plurality of images to obtain a plurality of respective in-focus components of the respective plurality of images; and
spatially demodulating the plurality of respective in-focus components to obtain a plurality of respective sectioned images of the target scene at respective depths of focus, the plurality of respective sectioned images being combinable to form a three-dimensional image or a color image of the target scene.

13. The method of claim 1, further including applying a frequency transformation to the image to obtain a frequency representation of the image, and wherein at least one of estimating the out-of-focus component, subtracting the out-of-focus component, and spatially demodulating the in-focus component is performed in the image space.

14. The method of claim 13, wherein the sectioned image of the target scene is in frequency space, and the method further including applying an inverse frequency transformation to obtain a sectioned image of the target scene in image space.

15. An optical sectioning device, comprising:
memory configured to store an image of a target scene, the image captured with a structured illumination source applied thereto, the structured illumination having a spatial frequency; and
a processor communicatively coupled to the memory and configured to estimate an out-of-focus component of the image using the spatial frequency,
the processor further configured to subtract the out-of-focus component of the image from the image to obtain an in-focus component of the image,
the processor further configured to spatially demodulate the in-focus component of the image to obtain a sectioned image of the target scene.

16. The device of claim 15, wherein the processor is further configured to estimate the out-of-focus component by applying a notch filter to the image, the notch filter having a frequency substantially equal to the spatial frequency of the structured illumination source.

17. The device of claim 15, wherein the processor is further configured to determine the spatial frequency of the structured illumination from the image.

18. The device of claim 15, wherein the processor is further configured to spatially demodulate using a demodulation selected from the group consisting of a Hilbert transform, a spiral Hilbert transform, and a Weiner filter to the in-focus component.

19. The device of claim 15, wherein:
the memory is further configured to store a plurality of images of the target scene having the structured illumination source applied thereto; and
the processor is further configured to:
estimate a plurality of respective out-of-focus components of the respective plurality of images using the spatial frequency;
subtract the respective out-of-focus components from the respective plurality of images to obtain a plurality of respective in-focus components of the respective plurality of images; and
spatially demodulate the plurality of respective in-focus components to obtain a plurality of respective sectioned images of the target scene at respective depths of focus, the plurality of respective sectioned images being combinable to form a three-dimensional image or a color image of the target scene.

20. An optical sectioning device comprising:
means for estimating an out-of-focus component of an image of a target scene using a spatial frequency, the image of the target scene captured with structured illumination having the spatial frequency applied to the target scene;
means for subtracting the out-of-focus component of the image from the image to obtain an in-focus component of the image; and
means for spatially demodulating the in-focus component of the image to obtain a sectioned image of the target scene.

* * * * *